United States Patent [19]
Arita

[11] Patent Number: 5,821,926
[45] Date of Patent: Oct. 13, 1998

[54] METHOD OF GENERATING AN OPERATING BUTTON FOR COMPUTER PROCESSING, METHOD OF RETRIEVING DATA WITH THE OPERATING BUTTON AND METHOD OF DISPLAYING THE OPERATING BUTTON

[75] Inventor: Hidehiro Arita, Tokyo, Japan

[73] Assignee: NJK Corporation, Tokyo, Japan

[21] Appl. No.: 604,946

[22] PCT Filed: Aug. 30, 1995

[86] PCT No.: PCT/JP95/01721

§ 371 Date: Feb. 29, 1996

§ 102(e) Date: Feb. 29, 1996

[87] PCT Pub. No.: WO96/07131

PCT Pub. Date: Mar. 7, 1996

[30] Foreign Application Priority Data

| Aug. 31, 1994 | [JP] | Japan | 6-207507 |
| Sep. 29, 1994 | [JP] | Japan | 6-235018 |
| Oct. 12, 1994 | [JP] | Japan | 6-246282 |
| Oct. 25, 1994 | [JP] | Japan | 6-260424 |
| Oct. 31, 1994 | [JP] | Japan | 6-267578 |
| Nov. 14, 1994 | [JP] | Japan | 6-279206 |
| Dec. 9, 1994 | [JP] | Japan | 6-306519 |
| Dec. 26, 1994 | [JP] | Japan | 6-323220 |

[51] Int. Cl.[6] .................................................. G06F 3/00
[52] U.S. Cl. ........................................ 345/333; 345/349
[58] Field of Search .................................... 395/333, 334, 395/349, 335, 339, 352, 353, 354, 356, 348; 345/349, 333, 335, 339, 352, 353, 354, 356, 348

[56] References Cited

U.S. PATENT DOCUMENTS

| 5,295,242 | 3/1994 | Mashruwala et al. | 345/353 |
| 5,390,295 | 2/1995 | Bates et al. | 345/342 |
| 5,428,776 | 6/1995 | Rothfield | 345/348 |
| 5,644,739 | 7/1997 | Moursund | 345/354 |
| 5,644,740 | 7/1997 | Kiuchi | 345/356 |

FOREIGN PATENT DOCUMENTS

| 348927 | 3/1991 | Japan . |
| 464125 | 2/1992 | Japan . |
| 470926 | 3/1992 | Japan . |
| 4262420 | 9/1992 | Japan . |
| 4281573 | 10/1992 | Japan . |
| 4319726 | 11/1992 | Japan . |
| 4346124 | 12/1992 | Japan . |
| 4367962 | 12/1992 | Japan . |

*Primary Examiner*—Matthew M. Kim
*Assistant Examiner*—Cao H. Nguyen
*Attorney, Agent, or Firm*—Webb Ziesenheim Bruening Logsdon Orkin & Hanson, P.C.

[57] ABSTRACT

The present invention is directed to automatic generation of an operating button for instructing a processing to be executed by a computer on the basis of latest data and display thereof on a display unit, and comprises setting a button class corresponding to an arbitrary field of a plurality of data composed of a plurality of fields and stored in a memory, setting a button group that groups data values classified by the button classes and stored in the memory and individual buttons that correspond to the respective data values and displaying the button group and the individual buttons as an operating button on a display unit. The present invention not only enables the user to implement selection and direction by means of an operating button readily within a short time without the need of operation-related processing software for a menu, buttons, etc. but also facilitates maintenance.

16 Claims, 23 Drawing Sheets

FIG. 1

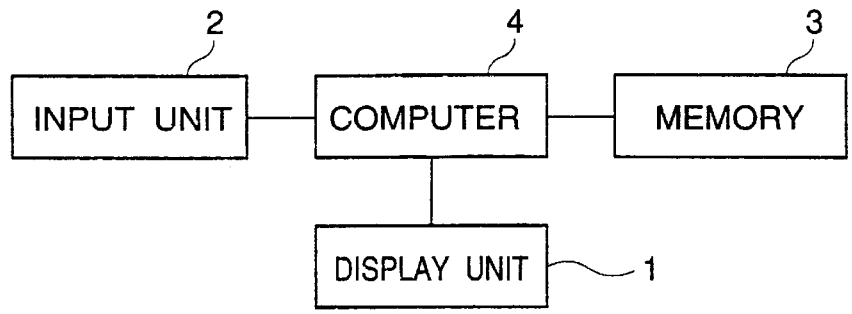

FIG. 2

| FIELD   | FIELD 1  | FIELD 2  | FIELD 3     | FIELD 4                    | FIELD 5 | FIELD 6 · · · |
|---------|----------|----------|-------------|----------------------------|---------|---------------|
| * DATA 1  | TOKYO    | STORE T1 | COMMODITY A | FOODSTUFF                  | 550     | 526           |
| * DATA 2  | TOKYO    | STORE T1 | COMMODITY B | COSMETIC                   | 150     | 162           |
| * DATA 3  | TOKYO    | STORE T2 | COMMODITY C | DRESS                      | 240     | 180           |
| DATA 4  | OSAKA    | STORE O1 | COMMODITY A | FOODSTUFF                  | —       | 80            |
| DATA 5  | OSAKA    | STORE O2 | COMMODITY B | COSMETIC                   | —       | 44            |
| DATA 6  | AICHI    | STORE A1 | COMMODITY C | DRESS                      | —       | 806           |
| DATA 7  | HOKKAIDO | STORE H1 | COMMODITY A | FOODSTUFF                  | —       | 186           |
| DATA 8  | FUKUOKA  | STORE F1 | COMMODITY D | DRESS                      | —       | —             |
| * DATA 9  | TOKYO    | STORE T3 | COMMODITY C | DRESS                      | 360     | 268           |
| * DATA 10 | TOKYO    | STORE T4 | COMMODITY E | MEN'S SUIT                 | 220     | 235           |
| * DATA 11 | KANAGAWA | STORE K1 | COMMODITY A | FOODSTUFF                  | —       | —             |
| * DATA 12 | TOKYO    | STORE T4 | COMMODITY F | TOY                        | 100     | 162           |
| * DATA 13 | TOKYO    | STORE T2 | COMMODITY A | FOODSTUFF                  | 450     | 448           |
| * DATA 14 | TOKYO    | STORE T2 | COMMODITY G | HOUSEHOLD ELEC. APPLIANCE  | 300     | 307           |
| * DATA 15 | TOKYO    | STORE T3 | COMMODITY E | MEN'S SUIT                 | 250     | 270           |
| * DATA 16 | TOKYO    | STORE T4 | COMMODITY H | DAILY GOODS                | 160     | 153           |
| * DATA 17 | KANAGAWA | STORE K2 | COMMODITY A | FOODSTUFF                  | —       | —             |
| * DATA 18 | SAITAMA  | STORE S1 | COMMODITY B | COSMETIC                   | —       | —             |
| * DATA 19 | SAITAMA  | STORE S2 | COMMODITY D | DRESS                      | —       | —             |
| * DATA 20 | CHIBA    | STORE C1 | COMMODITY C | DRESS                      | —       | —             |

· · ·

THE MARK " * " INDICATES DATA INCLUDED IN THE KANTO DISTRICT.

THE MARK " — " INDICATES THE STATE OF HAVING THE DATA VALUE OMITTED BECAUSE IT HAS NO DIRECT RELATION WITH THE DESCRIPTION.

FIG. 3a
| FIELD | FIELD 1 | FIELD 2 | FIELD 3 | FIELD 4 | · · · |
|---|---|---|---|---|---|
↓ ↓ ↓ ↓
| BUTTON CLASS | BUTTON CLASS 1 | BUTTON CLASS 2 | BUTTON CLASS 3 | BUTTON CLASS 4 |
|---|---|---|---|---|
| DESIGNATION OF BUTTON CLASS | "DISTRICT" | "STORE" | "COMMODITY" | "DEPARTMENT" |
FIG. 3b
FIG. 4a
BUTTON CLASS 1
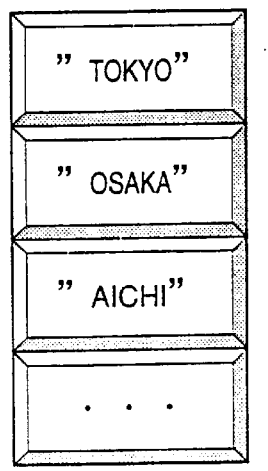
FIG. 4b
BUTTON CLASS 3
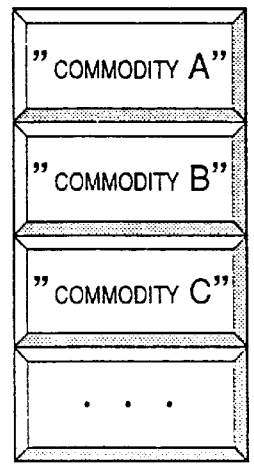

FIG. 5a
BUTTON GROUP 1-1
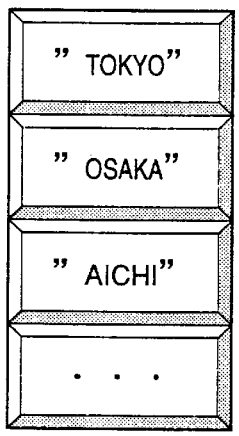
FIG. 5b
BUTTON GROUP 1-2
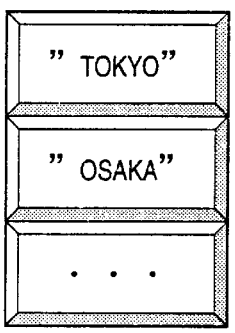
FIG. 5c
BUTTON GROUP 3-1
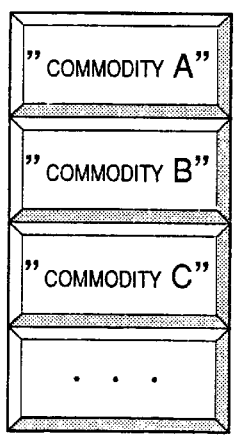
FIG. 5d
BUTTON GROUP 3-2
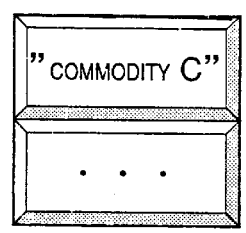
FIG. 6
| STATE OF SELECTION | | BUTTON CODE |
|---|---|---|
| BUTTON CLASS 1 | BUTTON CLASS 3 | 2-DIGIT CODE COMPRISING BUTTON CLASS 1 AND BUTTON CLASS 3 SEQUENTIALLY CONCATENATED |
| "TOKYO" | "COMMODITY A" | 11 |
| "TOKYO", "OSAKA" | "COMMODITY A" | 11 , 21 |
| "OSAKA" | "COMMODITY A", "COMMODITY B" | 21 , 22 |
| "TOKYO", "OSAKA" | "COMMODITY A", "COMMODITY B" | 11 , 12 , 21 , 22 |

[EXISTING BUTTON] [DEFINITION OF NEW BUTTON] [AFTER MULTIPLICATION OF NEW BUTTON]

BUTTON CLASS "STORE"  BUTTON CLASS "STORE"
BUTTON GROUP "KANTO DISTRICT"  BUTTON GROUP "KANTO DISTRICT"

FIG. 8a
[BUTTON AFTER MULTIPLICATION]
FIG. 8b
[SELECTED NEW BUTTON]
FIG. 8c
[STATE OF BUTTON SELECTION EMULATED IN MEMORY]
BUTTON CLASS " STORE"
BUTTON GROUP " KANTO DISTRICT"
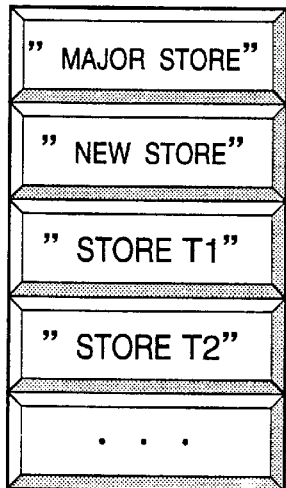
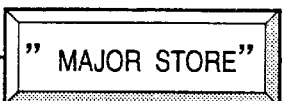
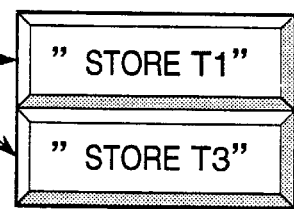
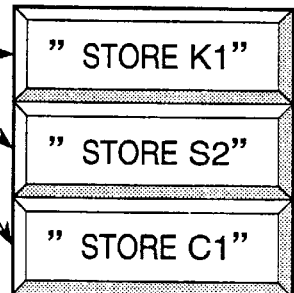

FIG. 9a
[EXISTING BUTTON]
BUTTON CLASS "STORE"
BUTTON GROUP "KANTO DISTRICT"
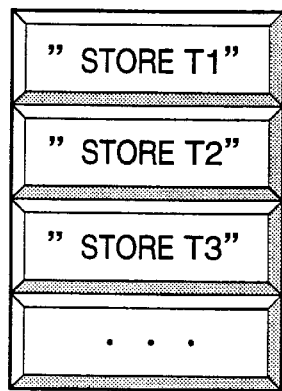
[EXISTING BUTTON]
BUTTON CLASS "COMMODITY"
BUTTON GROUP "MAJOR CLASSIFICATION"
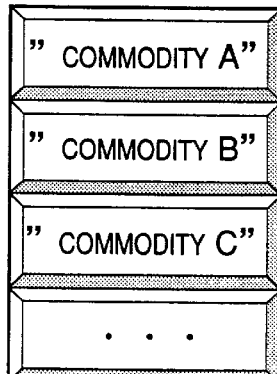
FIG. 9b
[DEFINITION OF NEW BUTTON]
FIG. 9c
[AFTER MULTIPLICATION OF NEW BUTTON]
BUTTON CLASS "MANAGEMENT ITEM"
BUTTON GROUP "KANTO DISTRICT"

FIG. 10a
INDIVIDUAL BUTTON / CORRESPONDING DATA VALUE TABLE

| INDIVIDUAL BUTTON | PROFIT |
|---|---|
| "STORE T1" | 150 |
| "STORE T2" | 62 |
| "STORE T3" | 200 |
| "STORE T4" | 140 |
| "STORE K1" | 30 |
| "STORE K2" | 5 |
| "STORE S1" | 7 |
| "STORE S2" | 2 |
| "STORE C1" | 4 |

PROFIT TOTAL 600

FIG. 10b
CONDUCTING DISPLAY SUMMARIZATION

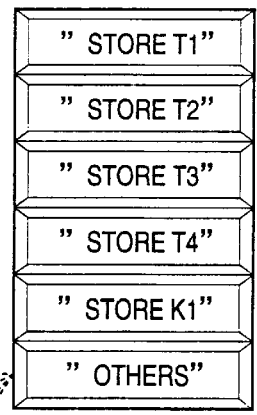

FIG. 10c
SELECTING DISPLAY SUMMARIZATION BUTTON

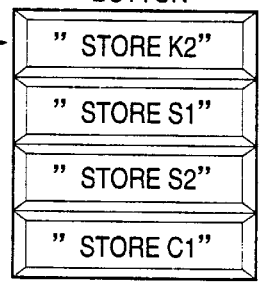

BUTTON CLASS "DISTRICT"
BUTTON GROUP "WHOLE COUNTRY"

FIG. 11a

BUTTON CLASS "STORE"
BUTTON GROUP "TOKYO"

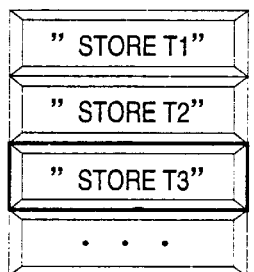

FIG. 11b

BUTTON CLASS "COMMODITY"
BUTTON GROUP "MAJOR CLASSIFICATION"

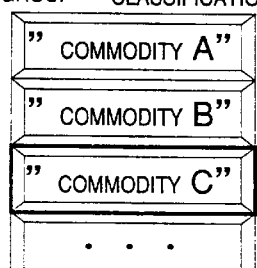

FIG. 11c

POSITION OF BUTTON SELECTION (COUNTED FROM FOREFRONT)

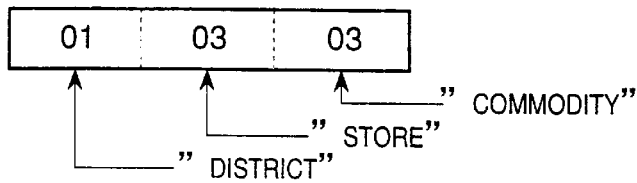

FIG. 11d

FIG. 12
BUTTON / DATA LINK TABLE
| DATA NO. | BUTTON SELECTION PATTERN | | |
|---|---|---|---|
| | DISTRICT | STORE | COMMODITY |
| 001 | 01 | 01 | 01 |
| 002 | 01 | 01 | 02 |
| 003 | 01 | 02 | 03 |
| 004 | 02 | 01 | 01 |
| 005 | 02 | 02 | 02 |
| 006 | 03 | 01 | 03 |
| 007 | 04 | 01 | 01 |
| 008 | 05 | 01 | 04 |
| 009 | 01 | 03 | 03 |
| 010 | 01 | 04 | 05 |
| . . . | . . . | . . . | . . . |
FIG. 13a
BUTTON CLASS "DISTRICT"
BUTTON GROUP "WHOLE COUNTRY"
FIG. 13b
BUTTON CLASS "STORE"
BUTTON GROUP "TOKYO"
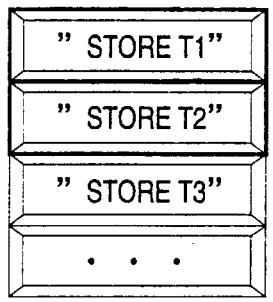
FIG. 13c
BUTTON CLASS "COMMODITY"
BUTTON GROUP "MAJOR CLASSIFICATION"
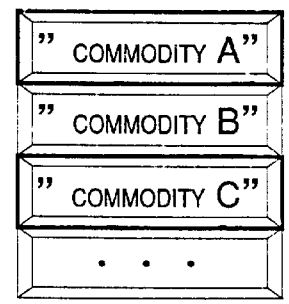

FIG. 14
BUTTON CLASS " AMOUNT"
BUTTON GROUP " RANK"
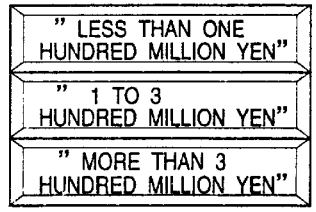
FIG. 15
BUTTON / DATA LINK TABLE
| INDEX<br>UNIQUE BUTTON SELECTION PATTERN | | | CORRESPONDING DATA<br>DATA NO. ( 1 OR PLURAL ) | | |
|---|---|---|---|---|---|
| DISTRICT | STORE | COMMODITY | 1 | 2 | ... |
| 01 | 01 | 01 | 001 | ... | |
| 01 | 01 | 02 | 002 | ... | |
| 01 | 02 | 03 | 003 | ... | |
| ... | ... | ... | ... | | |
FIG. 16a
BUTTON CLASS " REPORT PARTITION"
BUTTON GROUP " BUSINESS RESULT"
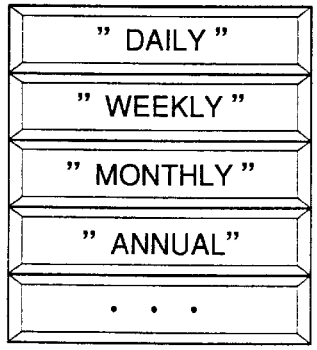
FIG. 16b
BUTTON CLASS " STORE"
BUTTON GROUP " KANTO DISTRICT"
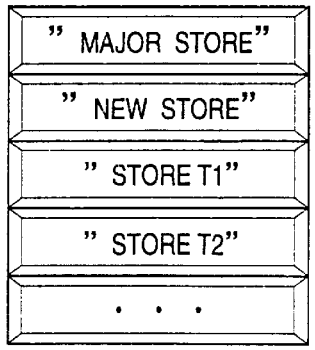
FIG. 16c
BUTTON CLASS " MANAGEMENT ITEM"
BUTTON GROUP " SUMMARY"
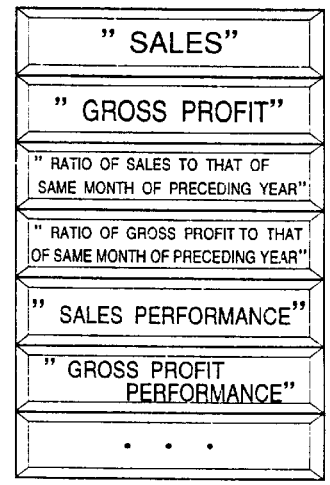

BUTTON MANIPULATION HISTORY TABLE

| HISTORY NO. | MANIPULATION HISTORY | LATEST POSITION |
|---|---|---|
| 1 | 01 > 03,  04 > 01, 02 | |
| 2 | 03 > 01 > 01, 02, 03, 04, 05, 06 | |
| 3 | 03 > 02 > 01, 02, 05, 06 | ◆ |
| | . . . | |
| 1000 | α | |

BUTTON CLASS "REPORT PARTITION"
BUTTON GROUP "BUSINESS RESULT"

BUTTON CLASS "STORE"
BUTTON GROUP "KANTO DISTRICT"

BUTTON CLASS "MANAGEMENT ITEM"
BUTTON GROUP "SUMMARY"

BUTTON CLASS "DISTRICT"
BUTTON GROUP "WHOLE COUNTRY"

BUTTON CLASS "COMMODITY"
BUTTON GROUP "MAJOR CLASSIFICATION"

FIG. 23a
INDIVIDUAL BUTTON SELECTION FREQUENCY TABLE

| INDIVIDUAL BUTTON | SELECTION FREQUENCY |
|---|---|
| " TOKYO " | 12 |
| " OSAKA " | 7 |
| " AICHI " | 25 |
| " HOKKAIDO" | 6 |

FIG. 23b
CHANGING DISPLAY SEQUENCE

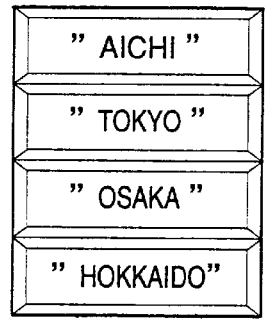

FIG. 23c
FURTHER, CHANGING DISPLAY SIZE

FIG. 23d
CHANGING DISPLAY SIZE

FIG. 23e
FURTHER, CHANGING DISPLAY SEQUENCE

FIG. 24a
INDIVIDUAL BUTTON / CORRESPONDING DATA VALUE TABLE

| INDIVIDUAL BUTTON | SALES |
|---|---|
| " TOKYO " | 868 |
| " OSAKA " | 124 |
| " AICHI " | 806 |
| " HOKKAIDO" | 186 |

FIG. 24b
CHANGING DISPLAY SEQUENCE

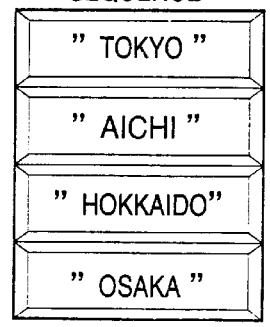

FIG. 24c
FURTHER, CHANGING DISPLAY SIZE

FIG. 25a

INDIVIDUAL BUTTON DISPLAY POSITION TABLE

| INDIVIDUAL BUTTON | DISPLAY POSITION |
|---|---|
| "TOKYO" | 02 |
| "OSAKA" | 04 |
| "AICHI" | 03 |
| "HOKKAIDO" | 01 |

FIG. 25b

CHANGING DISPLAY SEQUENCE

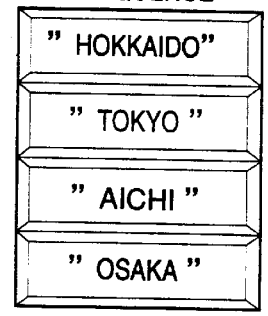

"HOKKAIDO"
"TOKYO"
"AICHI"
"OSAKA"

FIG. 26a

CUMULATIVE SELECTION FREQUENCY BY EVERY BUTTON CLASS TABLE

| BUTTON CLASS | CUMULATIVE SELECTION FREQUENCY |
|---|---|
| "DISTRICT" | 50 |
| "COMMODITY" | 25 |

FIG. 26b

CHANGING DISPLAY SIZE OF BUTTON CLASS PER SE

BUTTON CLASS "DISTRICT"

"TOKYO"
"OSAKA"
"AICHI"
"HOKKAIDO"

2 : 1

BUTTON CLASS "COMMODITY"

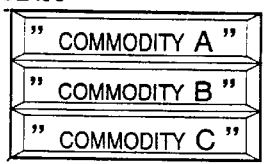

"COMMODITY A"
"COMMODITY B"
"COMMODITY C"

BUTTON CLASS "DISTRICT"
BUTTON GROUP "KANTO"

BUTTON CLASS "STORE"
BUTTON GROUP "KANTO"

BUTTON CLASS "COMMODITY"
BUTTON GROUP "MAJOR CLASSIFICATION"

PARALLEL CORRELATION: "DISTRICT"

BUTTON CLASS "DISTRICT"
BUTTON GROUP "KANTO"

BUTTON CLASS "STORE"
BUTTON GROUP "TOKYO"

BUTTON CLASS "COMMODITY"
BUTTON GROUP "TOKYO"

FIG. 29a

PARALLEL CORRELATION: "STORE"

BUTTON CLASS "DISTRICT"
BUTTON GROUP "STORE T2"

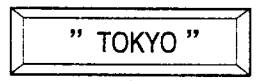
"TOKYO"

FIG. 29b

BUTTON CLASS "STORE"
BUTTON GROUP "KANTO"

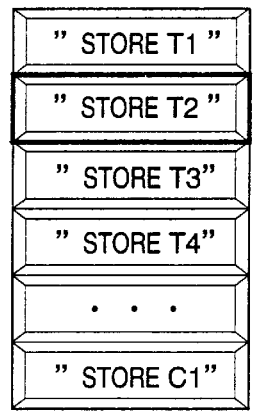
"STORE T1"
"STORE T2"
"STORE T3"
"STORE T4"
. . .
"STORE C1"

FIG. 29c

BUTTON CLASS "COMMODITY"
BUTTON GROUP "STORE T2"

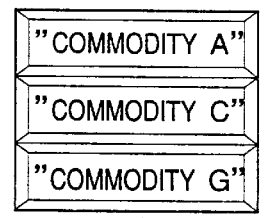
"COMMODITY A"
"COMMODITY C"
"COMMODITY G"

FIG. 30a

PARALLEL CORRELATION: "COMMODITY"

BUTTON CLASS "DISTRICT"
BUTTON GROUP "COMMODITY A"

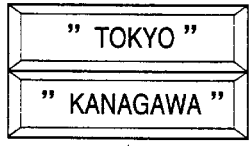
"TOKYO"
"KANAGAWA"

FIG. 30b

BUTTON CLASS "STORE"
BUTTON GROUP "COMMODITY A"

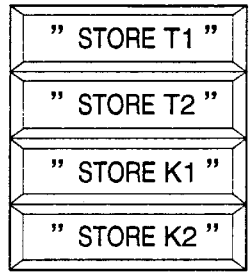
"STORE T1"
"STORE T2"
"STORE K1"
"STORE K2"

FIG. 30c

BUTTON CLASS "COMMODITY"
BUTTON GROUP "MAJOR CLASSIFICATION"

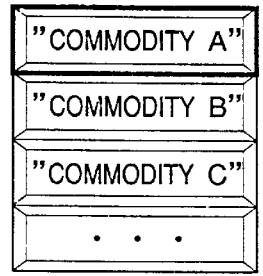
"COMMODITY A"
"COMMODITY B"
"COMMODITY C"
. . .

FIG. 31a    FIG. 31b    FIG. 31c
HIERARCHICAL CORRELATION : "DISTRICT"→"STORE"→"COMMODITY"
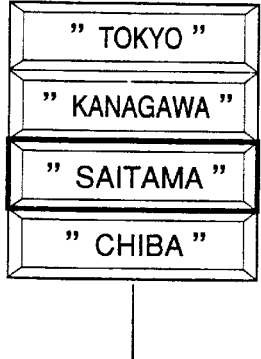
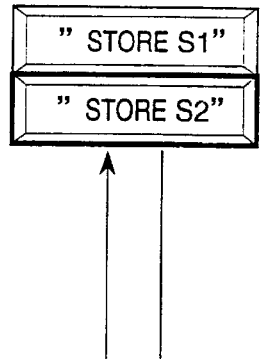
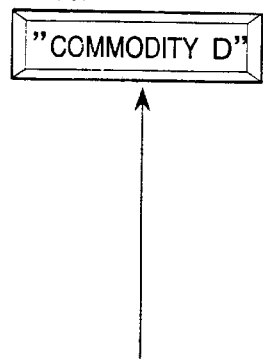
FIG. 32a    FIG. 32b    FIG. 32c
HIERARCHICAL CORRELATION : "COMMODITY"→"DISTRICT"→"STORE"
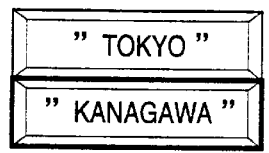
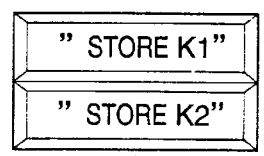
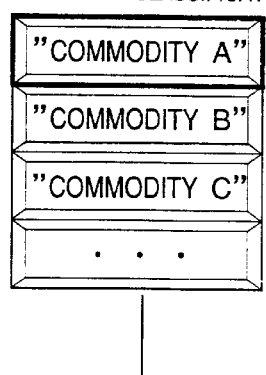

FIG. 33a

BUTTON CLASS "STORE"
BUTTON GROUP "TOKYO"

- "STORE T1"
- "STORE T2"
- "STORE T3"
- "STORE T4"

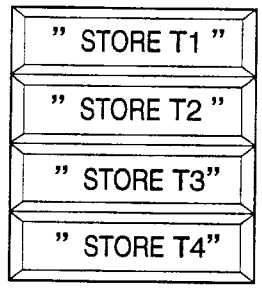

FIG. 33b

BUTTON CLASS "DEPARTMENT"
BUTTON GROUP "MAJOR DEPARTMENT"

- "FOODSTUFF"
- "COSMETIC"
- "DRESS"
- "MEN'S SUIT"
- "TOY"
- "HOUSEHOLD ELEC. APPLIANCE"
- "DAILY GOODS"

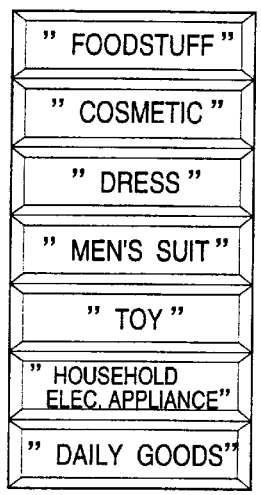

FIG. 33c

BUTTON CLASS "COMMODITY"
BUTTON GROUP "MAJOR CLASSIFICATION"

- "COMMODITY A"
- "COMMODITY B"
- "COMMODITY C"
- "COMMODITY D"
- "COMMODITY E"
- "COMMODITY F"
- "COMMODITY G"
- "COMMODITY H"

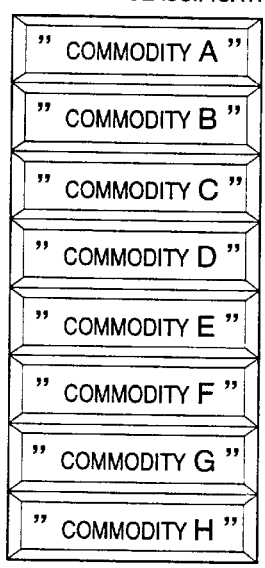

FIG. 34

CHARACTER DISPLAY BUTTON    SWITCHING    MULTIMEDIA INFORMATION OUTPUT BUTTON (DOTTED BUTTON)

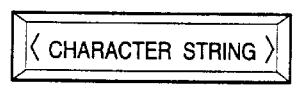 ↔ 

〈CHARACTER STRING〉 ↔ 〈GRAPHIC〉

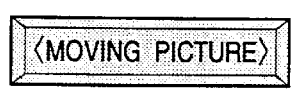 ↔ 

〈MOVING PICTURE〉 ↔ 〈STILL PICTURE〉

 ↔ 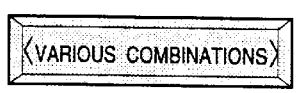

〈VOICE〉 ↔ 〈VARIOUS COMBINATIONS〉

FIG. 35
FORMAT OF BUTTON CLASS MMBT

| ⟨BUTTON CLASS id1⟩ | ⟨BUTTON INFORMATION CODE 1⟩ | ⟨INDIVIDUAL BUTTON MMBT REFERENCE 1 BY EVERY BUTTON GROUP⟩ |
|---|---|---|
| ⟨BUTTON CLASS id2⟩ | ⟨BUTTON INFORMATION CODE 2⟩ | ⟨INDIVIDUAL BUTTON MMBT REFERENCE 2 BY EVERY BUTTON GROUP⟩ |
| . . . | . . . | . . . |

NOTE: MMBT IS AN ABBREVIATION FOR MULTIMEDIA INFORMATION BUTTON TABLE.

FIG. 36
FORMAT OF ⟨BUTTON INFORMATION CODE⟩

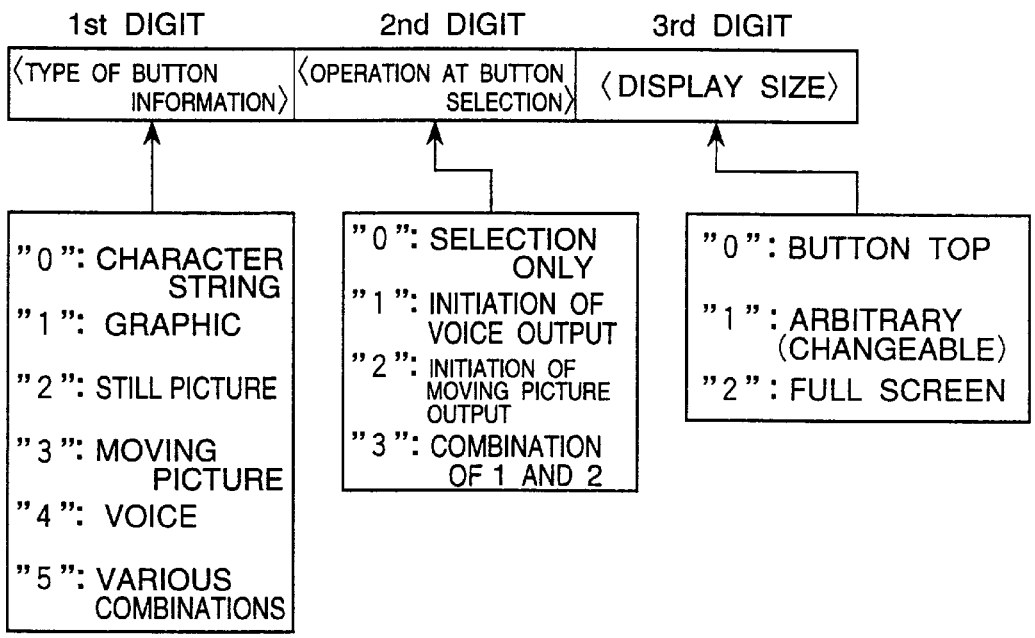

FIG. 37
FORMAT OF INDIVIDUAL BUTTON MMBT BY EVERY BUTTON GROUP

| ⟨INDIVIDUAL BUTTON id1⟩ | ⟨BUTTON INFORMATION CODE 1⟩ | ⟨BUTTON INFORMATION (CONTENTS) STORAGE SECTION 1⟩ |
|---|---|---|
| ⟨INDIVIDUAL BUTTON id2⟩ | ⟨BUTTON INFORMATION CODE 2⟩ | ⟨BUTTON INFORMATION (CONTENTS) STORAGE SECTION 2⟩ |
| . . . | . . . | . . . |

FIG. 38

BUTTON CLASS MMBT" b c l a s s . m b t "

| " STORE " | " 0 0 0 " | " t o k y o . m b t " |
|---|---|---|
| "DEPARTMENT" | " 2 0 0 " | " s b u m o n . m b t " |
| " COMMODITY " | " 2 0 0 " | " d b u n r u i . m b t " |

NOTE : m b t MEANS A CHARACTER STRING FOR IDENTIFICATION OF "MULTIMEDIA INFORMATION BUTTON TABLE" (APPLICABLE BELOW) .

FIG. 39a

INDIVIDUAL BUTTON MMBT BY EVERY BUTTON GROUP
" t o k y o . m b t " (BUTTON GROUP "TOKYO")

| " STORE T1" | " 2 0 0 " | " s h b y . p h t " |
|---|---|---|
| " STORE T2" | " 2 0 0 " | " i k b k r . p h t " |
| . . . | | |

NOTE : p h t MEANS A CHARACTER STRING FOR IDENTIFICATION OF "STILL PICTURE" INFORMATION. (APPLICABLE BELOW)

FIG. 39b

INDIVIDUAL BUTTON MMBT BY EVERY BUTTON GROUP
" sbumon.mbt " (BUTTON GROUP "MAJOR DEPARTMENT")

| " FOODSTUFF " | " * * * " | " f d . p h t " |
|---|---|---|
| " COSMETIC " | " * * * " | " c s m t c . p h t " |
| . . . | | |

FIG. 39c

INDIVIDUAL BUTTON MMBT BY EVERY BUTTON GROUP
" dbunrui.mbt " (BUTTON GROUP "MAJOR CLASSIFICATION")

| " COMMODITY A" | " 3 2 1 " | " s f 1 . p h t " , " s f 1 . m v i " |
|---|---|---|
| " COMMODITY B" | " 3 2 1 " | " s c 2 . p h t " , " s c 2 . m v i " |
| . . . | | |

NOTE : m v i MEANS A CHARACTER STRING FOR IDENTIFICATION OF "MOVING PICTURE" INFORMATION.

FIG. 40a

SALES DATA BY EVERY INDIVIDUAL BUTTON

BUTTON CLASS "STORE"
BUTTON GROUP "TOKYO"

| INDIVIDUAL BUTTON | "BUDGET" | "RESULT" | PERFORMANCE |
|---|---|---|---|
| "STORE T1" | 700 | 688 | 98% |
| "STORE T2" | 990 | 935 | 94% |
| "STORE T3" | 610 | 538 | 88% |
| "STORE T4" | 480 | 550 | 115% |

FIG. 40b

BUTTON CLASS "DEPARTMENT"
BUTTON GROUP "MAJOR DEPARTMENT"

| INDIVIDUAL BUTTON | "BUDGET" | "RESULT" | PERFORMANCE |
|---|---|---|---|
| "FOODSTUFF" | 1,000 | 974 | 97% |
| "COSMETIC" | 150 | 162 | 108% |
| "DRESS" | 600 | 448 | 75% |
| "MEN'S SUIT" | 470 | 505 | 107% |
| "TOY" | 100 | 162 | 162% |
| "HOUSEHOLD ELEC. APPLIANCE" | 300 | 307 | 102% |
| "DAILY GOODS" | 160 | 153 | 96% |

FIG. 41

DATA MONITORING REFERENCE TABLE (COMMON TO BOTH OF BUTTON CLASS "STORE" AND "DEPARTMENT")

NOTE : "R" MEANS RED, "Y" YELLOW, "G" GREEN AND "B" BLUE (APPLICABLE BELOW)

| NO. | CONDITIONAL EXPRESSION | COLOR OF BUTTON |
|---|---|---|
| 1 | "BUDGET"* 80% > "RESULT" | "R" |
| 2 | "BUDGET"* 90% > "RESULT" | "Y" |
| 3 | "BUDGET"* 110% < "RESULT" | "G" |
| 4 | "BUDGET"* 120% < "RESULT" | "B" |
| ... | ... | |

FIG. 42a

BUTTON CLASS " STORE "
BUTTON GROUP " TOKYO "

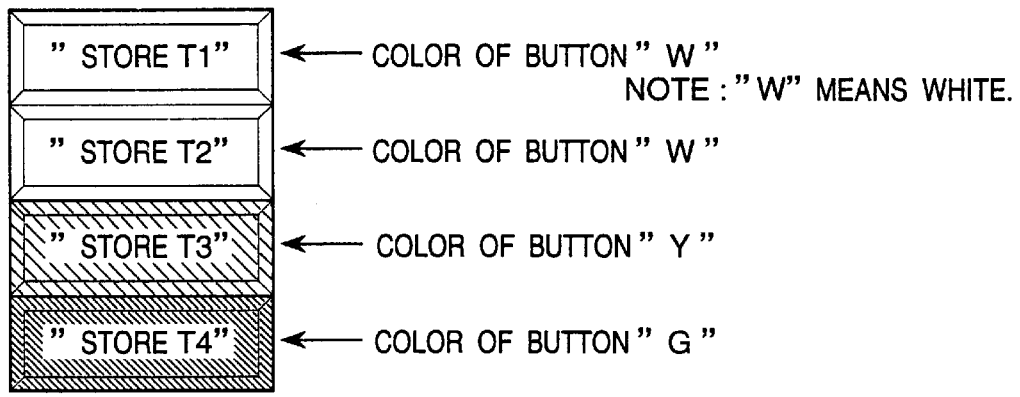

"STORE T1" ← COLOR OF BUTTON " W "
NOTE : " W " MEANS WHITE.
"STORE T2" ← COLOR OF BUTTON " W "
"STORE T3" ← COLOR OF BUTTON " Y "
"STORE T4" ← COLOR OF BUTTON " G "

FIG. 42b

BUTTON CLASS " DEPARTMENT "
BUTTON GROUP " MAJOR DEPARTMENT "

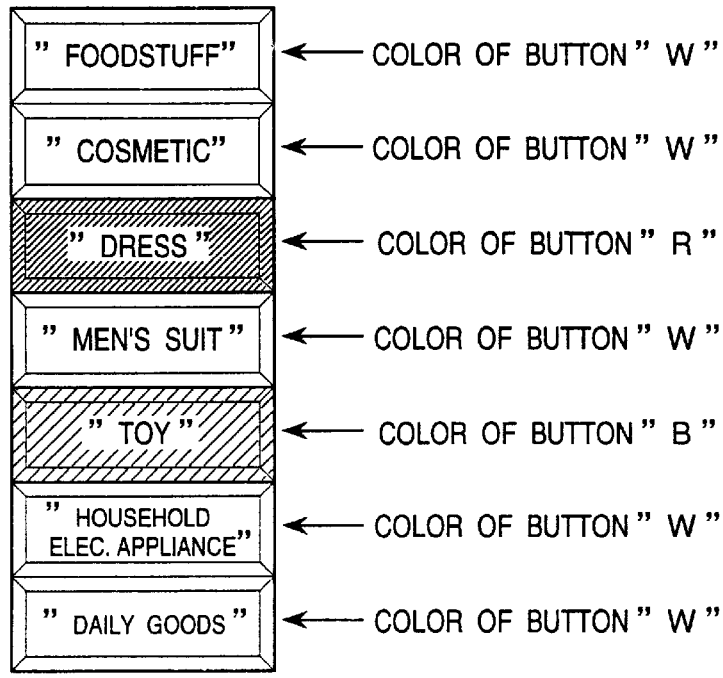

"FOODSTUFF" ← COLOR OF BUTTON " W "
"COSMETIC" ← COLOR OF BUTTON " W "
"DRESS" ← COLOR OF BUTTON " R "
"MEN'S SUIT" ← COLOR OF BUTTON " W "
"TOY" ← COLOR OF BUTTON " B "
"HOUSEHOLD ELEC. APPLIANCE" ← COLOR OF BUTTON " W "
"DAILY GOODS" ← COLOR OF BUTTON " W "

METHOD OF GENERATING AN OPERATING BUTTON FOR COMPUTER PROCESSING, METHOD OF RETRIEVING DATA WITH THE OPERATING BUTTON AND METHOD OF DISPLAYING THE OPERATING BUTTON

TECHNICAL FIELD

This invention relates to a method of generating an operating button for computer processing in which the operating button for instructing a processing to be executed by a computer can be automatically generated from the data values stored in a computer memory or generated on the basis of existing operating buttons per se and displayed on a display unit. Further, the present invention relates to a method of retrieving data with the use of the operating button for computer processing in which the operating button displayed on a display unit and data stored in a memory are mutually correlated to thereby quickly fetch appropriate data from the memory. Still further, the present invention relates to a method of displaying the operating button for computer processing in which the display method for the operating button can appropriately be changed in accordance with the condition of the user's use, the information needs and the like.

BACKGROUND ART

Conventionally, in commanding a computer a processing, it has generally been carried out to display a menu or operating buttons on a display or display unit and to implement selection and direction on the menu or operating buttons with the use of an input unit such as a keyboard or a mouse. For example, in fetching any data from the data stored in a computer memory, it has been carried out to display operating buttons as an aggregate of individual buttons on a display unit and to implement selection and direction among the individual buttons by means of an input unit.

The above display and selection are made with the use of a language or descriptive method such as program, command, macro or script in accordance with each design applied, and the data such as displayed designation and code are entered or defined in the form of a master file or an intra memory table and previously stored in a memory, which are updated according to necessity. In any case, when a new individual button becomes necessary, it has been requisite not only to add the new button with the use of the above language or descriptive method but also to newly specify a procedure to be followed at the selection of the new button. Further, in the creation or change of individual button display position, display size, display sequence and display summarization in which a plurality of individual buttons are summarized into one individual button and displayed, it has been needed to change the individual button display specification with the use of the above language or descriptive method.

Moreover, the hitherto employed individual buttons are generally not designed to perform display according to constantly changed data and have been limited to display for instructing processing whose fixed design is relatively easy or for controlling procedure therefor. Therefore, when retrieval is conducted based on, for example, a constantly changed store or commodity item, the method has been adopted such as one in which a table of such item designations is window displayed on a display unit and then selection is conducted. In this method, it has been needed to previously enter the above item designations in, for example, a master file and to constantly bring them to the latest status.

The display of operating buttons on a display unit is generally conducted by means of character strings, i.e., by disposing on the operating buttons respective character strings for identifying themselves. The user has identified the desired operating button by looking at the respective character strings disposed on the operating buttons. Consequently, when the user instructs the computer on a processing by this method, it has been a prerequisite that the user understands the meanings or contents of the above character strings. Moreover, even when it is intended to select few commodities, for example, whose sales result is lower than the budget (target), it has been required to conduct button manipulations comprising selecting operating buttons, actually retrieving data and comparing results with budgets with respect to all the commodities.

Now, the method is widely practices in which, when an individual button is selected and directed with the use of an input unit as mentioned above, the value (designation) specified by the individual button, for example, "Tokyo" is directly compared with the data value of the data object field, for example, the data value (designation) of field 1 shown in FIG. 2, or in which the storage address of the data agreeing with the data value of the object field is sought with the use of a previously created index table.

Further, when a sequence of button manipulations is to be rerun, the method is generally practiced in which the sequence of button manipulations is directly recorded and entered as a macro in a memory, which is recalled from the memory and executed when needed, or in which a procedure for the sequence of button manipulations is stored in a batch file and executed when needed, thereby saving the repetition of the same button manipulations. In this method, once the computer processing starts, generally either the redisplay of operating buttons is not conducted at all, or, if done, the redisplay is only one-way and continuous. In the method, it is unfeasible to arbitrarily change the stored button manipulations during the course of computer processing.

However, the development of individual operation-related software such as a menu or operating buttons as in the above prior art leads to not only much time consumption but also grave economic burden. Further, there has been a problem that the entry in master file, the definition of intramemory table and the like are requisite for the data such as displayed designation and code, so that maintenance is considerably troublesome for updating such as correction, change, addition and deletion of the data.

Moreover, when operating buttons are selected among those displayed on a display unit with the use of an input unit, an increase in the number of selected individual buttons not only causes this operation to be troublesome but also leads to increased probabilities of selection error and omission. Any attempt to add a new button summarizing a plurality of individual buttons for preventing the above necessitates leads to an application change, which means that only the addition of a new individual button is not satisfactory. That is, when this new button is selected, it has been required to newly provide a procedure to be executed in the application.

Also, in a sequence of button manipulations, it is needed to repeat the button manipulations which are completely or nearly identical with those previously conducted. This not only causes the button manipulations to be troublesome and wasteful but also would have increased probabilities of selection error and omission.

In the design in which a sequence of button manipulations is stored in a macro or batch file, whenever a new button manipulation occurs or a change is made to the button manipulations, not only must a macro or batch file be previously created or recreated prior to this processing but also, in running the macro or batch file, it is needed to store and specify each designation thereof. When the number of designations is increased, all the aspects of creation, maintenance and use thereof become very troublesome. Moreover, although the stored button manipulations are satisfactory up to the middle of the processing, the requirement such as one for change of manipulation instruction on the spot cannot be met with respect to the subsequent phase of the processing.

Unless the display specification for individual buttons is changed with the use of the above language or descriptive method which is pretty difficult or troublesome to the user, the individual button display remains unchanged. Therefore, there has been the problem that the occasions are gradually increasing in which, even when it is apparent that a change of the display specification for individual buttons would facilitates the use because of, for example, the change of the state of individual button selection attributed to changed information needs or the change of data contents, the use of the individual button display is continued with resignation or with patience without changing the individual button display.

The above method in which a table of item designations is displayed requires entering in advance item designations in a master file or the like and constantly updating the same to the latest status, so that not only is the user's burden in operation grave but also the computer processing may be troubled in accordance with the occurrence of item designation entry omission or updating mistake. Further, in this method, the table display is repeated as many times as the number of items, at each of which selection is conducted. Thus, thinking is visually interrupted every time the table display is switched, so that the method is not suitable for data retrieval made while being reminded of problems and tasks.

With respect to commodities being rich in variety, there is a limit in memorizing or understanding all the commodities by means of characters. In the method of display comprising only disposing respective character strings on operating buttons, occasionally, each of the respective designations displayed on the operating buttons does not conform to the real image thereof. In contrast, expressing a commodity by means of a photograph or graphic enables immediate understanding the commodity and is often very convenient for selecting the desired commodity. That is, the utilization of the intuitive memorization or recognition of the right part of the brain without resort to the logical memorization or understanding of the left part of the brain can facilitate the manipulation of operating button selection.

If whether or not the sales target has been achieved for a particular commodity is self diagnosed on the basis of the data value correlated with the respective individual button and the diagnosis result is reflected on, for example, the color of the individual button, that is, if the color of the individual button for the commodity on which the sales target has not been achieved is distinguished from the color of the individual button for the commodity on which the sales target has been achieved, for example, in the event that the data of the commodity on which the sales target has not been achieved is emphatically checked in seeking the cause, it enables the user to effect a manipulation of selecting the commodity on which the sales target has not been achieved separately from other commodities.

In the data retrieval, specifying a field value and comparing the value with that of the object field of a data or index table is accompanied by the disadvantage that an increase of each of the numbers of comparative object fields and characters leads to not only complicated manipulation required from the user and difficulty in the developer's creation of a processing procedure but also prolongation of the processing time.

In view of the above situation, an object of the method of generating an operating button for computer processing according to the present invention is not only to enable the user to easily instruct the computer on a processing on the basis of the latest information stored in the computer memory within a short period of time without the need of separately developing operation-related processing software but also to facilitate maintenance.

Another object of the method of generating an operating button for computer processing according to the present invention is to enable instructing the computer to execute exactly the same processing as based on a sequence of individual button selections in one operation of selecting a new individual button defined on the basis of existing individual buttons and multiplied, and also to enable executing selection and direction on presummarization individual buttons by means of a new individual button obtained by summarizing a plurality of individual buttons.

The object of the method of retrieving date with the use of an operating button for computer processing according to the present invention is to enable fetching corresponding data from a memory only by displaying operating buttons on a display unit and selecting arbitrary operating buttons from among those displayed and to realize a substantial saving in the processing time.

An object of the method of displaying an operating button for computer processing according to the present invention is to enable omitting all or part of the button manipulations according to the user's discretion at that time in the event that the same correlated button manipulations as before are required.

Another object of the method of displaying an operating button for computer processing according to the present invention is to enable performing the button manipulation under the optimum condition to the user at that time by displaying individual buttons in their optimum states in accordance with the user's needs such that the button manipulation facility is different in every user and altered.

A further object of the method of displaying an operating button for computer processing according to the present invention is to enable the user to easily conduct data retrieval with permitting associative thinking by automatically selecting individual buttons of another button class which are correlated through data with selected individual buttons on the basis of data values of each data field and selected individual buttons and redisplaying them.

Still a further object of the method of displaying an operating button for computer processing according to the present invention is to enable the user to easily select operating buttons with the utilization of the intuitive memorization or recognition of the right part of his brain by displaying operating buttons by means of not only character strings but also various multimedia information outputs switched therefrom.

Still a further object of the method of displaying an operating button for computer processing according to the present invention is to enable the user to conduct efficient button manipulations in accordance with the fundamental requirement by summarizing arbitrary data values correlated with an arbitrary individual button to thereby effect self diagnosis and displaying with the result being reflected on an operating button as diagnosis information.

SUMMARY OF THE INVENTION

For attaining the object, the method of generating an operating button for computer processing according to the present invention comprises setting a button class each corresponding to an arbitrary field of a plurality of data composed of a plurality of fields and stored in a memory, setting a button group that groups data values classified by the button class and stored in the memory and individual buttons that correspond to the respective data values and displaying the button groups and the individual buttons as operating buttons on a display unit.

This generation method enables instructing the computer on the processing to be executed by the setting button class corresponding to the arbitrary field of the latest data classified by a plurality of fields and stored in the memory, automatically generating operating buttons on the basis of values of data classified by the button class and stored in the memory and displaying them on the display unit and conducting selection and direction on the operating buttons. Thus, the user can readily carry out the selection and direction by means of the operating buttons within a short period of time without the need of developing operation-related processing software such as a menu or buttons. Moreover, with respect to updatings such as correction, change, addition and deletion of the data, the latest operating buttons can also be created only by either running an automatic updating processing or rerunning an automatic operating button generating processing with the use of latest data because a master file entry or an intra memory table definition is inherently not needed, thereby facilitating maintenance.

Another method of generating an operating button for computer processing comprises displaying on a display unit operating buttons composed of a button group being an aggregate of individual buttons and a button class integrating the button group, defining a new individual button summarizing those arbitrary among said individual buttons and multiplying the new individual button in a manner such that, when the new individual button is selected, the state of selection of individual buttons summarized in the new individual button is automatically emulated in a memory.

This method enables summarizing a sequence of button selecting manipulations needed for fetching data and information according to certain conditions into one button selecting manipulation before instructing the computer on the processing to be executed by defining a new individual button on the basis of, for example, individual button combination or inter-button-class connection of individual buttons, multiplying it and selecting a multiplied new individual button. Thus, not only can time-consuming processing such as application alteration or previous recording of a sequence of button selecting manipulations in the form of a macro be avoided to thereby attain simplification of this operation but also selection error or omission can be prevented.

A further method of generating an operating button for computer processing comprises displaying on a display unit operating buttons composed of a button group being an aggregate of individual buttons and a button class integrating the button group, wherein a plurality of individual buttons included in a single button class are summarized into one individual button on the basis of any of the frequency of individual button selections conducted with the use of an input unit, the data values stored in a memory which correspond to respective individual buttons and the user's arbitrary selection and the individual button is displayed.

This method enables summarizing, for example, a plurality of individual buttons whose use frequency is low into one individual button and displaying it to thereby permit preferential selection of individual buttons whose user's use frequency is high.

A method of retrieving data with the use of an operating button for computer processing comprises correlating operating buttons composed of a button group being an aggregate of individual buttons and a button class integrating the button group with data stored in a memory to thereby set a link table in the memory, identifying appropriate data on the basis of the position of individual button selected by means of an input unit among the operating buttons displayed on a display unit and the link table and fetching the data stored in the memory.

This method enables efficiently identifying appropriate data on the basis of the position of selected individual button and the link table without comparing a specified field value with the object field value and fetching the data stored in a memory at a high speed for use in various processings executed by the computer by displaying operating buttons on a display unit and selecting arbitrary individual buttons among the operating buttons with the use of an input unit. Thus, not only can the user's manipulation be simplified but also the data can be fetched at a high speed to thereby shorten the processing time and further the developer's workload for creating a procedure can be saved.

A first method of displaying an operating button for computer processing comprises redisplaying on a display unit operating buttons composed of a button group being an aggregate of individual buttons and a button class integrating the button group, wherein an operation history of a series of states of previously conducted individual button selection is stored in a button manipulation history table set in a memory and wherein, when an individual button is selected out of at least one button class at the selection of operating button, an individual button of another button class is redisplayed in its previously selected state on the basis of the operation history agreeing with the state of selection of the selected individual button.

In this method, when the same button manipulation as before is repeated, the individual button of another button class which is correlated with the selected individual button is displayed in the previously selected states on the basis of the manipulation history previously stored in the button manipulation history table set in the memory, by the selecting individual button of at least one button class. Thus, the user can save repeating all or part of the selecting manipulation.

A second method of displaying an operating button for computer processing comprises displaying on a display unit operating buttons composed of a button group being an aggregate of individual buttons and a button class integrating the button group, wherein the individual button display sequence within a single button class is varied on the basis of any of the frequency of individual button selections conducted with the use of an input unit, the data values stored in a memory which correspond to respective individual buttons and the user's arbitrary selection.

A third method of displaying an operating button for computer processing comprises displaying on a display unit operating buttons composed of a button group being an aggregate of individual buttons and a button class integrating the button group, wherein the individual button display size within a single button class is varied on the basis of either the frequency of individual button selections conducted with the use of an input unit or the data values stored in a memory which correspond to respective individual buttons.

A fourth method of displaying an operating button for computer processing comprises displaying on a display unit operating buttons composed of a button group being an aggregate of individual buttons and a button class integrating the button group, wherein at least one of the individual button display position and display size between button classes differing from each other is varied on the basis of either the cumulative frequency of individual button selections within each button class or the user's arbitrary selection.

These second to fourth methods enable button displays in the optimum states by automatically or intentionally varying the individual button display sequence and display size within a single button class on the basis of any of the frequency of individual button selections within a single button class, the data values stored in a memory which correspond to respective individual buttons and the user's arbitrary selection and by automatically or intentionally varying at least one of the individual button display position and display size between button classes differing from each other on the basis of either the cumulative frequency of individual button selections within each button class or the user's arbitrary selection. Thus, easy to see, easy to select and highly efficient button arrangement, i.e., facile button manipulation can be realized flexibly in compliance with the constantly varying user's information needs.

A fifth method of displaying an operating button for computer processing comprises displaying on a display unit operating buttons composed of a button group being an aggregate of individual buttons and a button class integrating the button group and redisplaying the individual button of another button class on the basis of an individual button selected with the use of an input unit, wherein the individual buttons of each button class are displayed in correlation with the data value within each field of the data stored in a memory, data retrieval is conducted on the basis of the selected individual button and the data value and the individual button of another button class corresponding to the data value within another field of the thus retrieved data is automatically extracted and redisplayed.

In this method, hierarchization may be conducted among the button classes, followed by redisplaying the individual button extraction of the other button class according to the hierarchical sequence.

This method not only enables reflecting data value changes on the individual button display by displaying the individual buttons of each button class on the basis of the data value of each field of the data stored in the memory but also enables the user to constantly conduct data retrieval with permitting associative thinking with the use of updated operating buttons without the need of changing the individual button specification or displaying an item designation list by automatically extracting correlated individual button of another button class by means of selected individual button and data and redisplaying them.

A sixth method of displaying an operating button for computer processing comprises displaying on a display unit operating buttons composed of a button group being an aggregate of individual buttons and a button class integrating the button group, wherein the display of individual button belonging to at least one button class is conducted not only by a character string but also by switching to any of various multimedia information outputs on the basis of an individual button multimedia information button table set and stored in a memory, in which the individual button is concatenated with various types of multimedia information such as character string, graphic, still picture, moving picture and voice.

In this method, a button class multimedia information button table can be set in the memory with a common specification on the individual button multimedia information being collectively defined for every button class.

In this method, when the operating button is displayed on the display unit in order to instruct the computer on a processing to be executed, not only character strings but also various multimedia information outputs switched therefrom can be disposed on the operating buttons in accordance with the multimedia information button table set and stored in the memory with the result that the user can more easily select operating buttons.

A seventh method of displaying an operating button for computer processing comprises displaying on a display unit operating buttons composed of a button group being an aggregate of individual buttons and a button class integrating the button group, wherein at least one data value among the data stored in a memory is summarized by every arbitrary individual button correlated with the data, the summarized data value is self diagnosed by means of a data monitoring reference table including a conditional expression providing a monitoring reference and an individual button falling under the monitoring reference is displayed according to another display specification on the basis of the self diagnosis based on the data monitoring reference table.

In this method, the summarization of at least one data value among the data stored in the memory may be conducted by every operating button belonging to at least one button class.

In the display of the operating button on a display unit, this method can comprise summarizing at least one data value among individual-button-correlated data by every individual button, self diagnosing the summarized data value with the use of a conditional expression providing a monitoring reference and displaying an individual button falling under the monitoring reference according to another display specification. Thus, the user can explicitly recognize whether or not the monitoring reference is met, so that efficient button manipulation can be conducted in accordance with the fundamental requirement.

BRIEF DESCRIPTION OF THE DRAWING

FIG. 1 is a block diagram showing the outline of a system for implementing the present invention;

FIG. 2 is a view showing an example of data structure together with data values stored in a memory;

FIG. 3 is a view provided to explain setting a button class from each field of data and assigning a designation to each button class;

FIG. 4 is a view showing the first example of the state of having button classes and individual buttons displayed on a display unit;

FIG. 5 is a view provided to explain automatic setting of button groups at hierarchical correlation of button classes;

FIG. 6 is a view provided to explain the relationship between button class and button code;

FIG. 8 is a view showing the state of having button manipulation emulated after the multiplication of a new individual button;

FIG. 9 is a view showing another example of manner in which a new individual button is defined from operating buttons displayed on a display unit and multiplied;

FIG. 10 is a view showing the state resulting from summarizing a plurality of buttons in a single button class on the basis of data values corresponding to respective individual buttons and displaying the summary on a display unit;

FIG. 11 is a view showing the second example of operating button make-up which has also been provided to explain display thereof on a display unit and selection therefrom;

FIG. 12 is a view showing a form of a link table linking operating button with data;

FIG. 13 is a view showing the state of having a plurality of individual buttons selected out of an arbitrary button class;

FIG. 14 is a view showing an example of each of button class, button group and individual button employed when each field value of data is an amount (numerical value);

FIG. 15 is a view showing a form of another link table linking operating button with data according to index format;

FIG. 16 is a view showing the third example of operating button make-up displayed on a display unit;

FIG. 23 is a view showing examples of operating buttons displayed on a display unit with the display sequence and display size of each of individual buttons of a single button class being varied on the basis of the frequency of selections of the respective individual button of the button class;

FIG. 24 is a view showing examples of operating buttons displayed on a display unit with the display sequence and display size of each of individual buttons of a single button class being varied on the basis of the value of data corresponding to the respective individual button of the button class;

FIG. 25 is a view showing examples of operating buttons displayed on a display unit with the display sequence of each of individual buttons of a single button class being varied on the basis of the user's arbitrary direction within the button class;

FIG. 26 is a view showing examples of operating buttons displayed on a display unit with the display size of each individual button being varied between different button classes on the basis of the cumulative frequency of selections of the respective individual button of the differed button class;

FIG. 29 is a view showing another example of the same as in FIG. 28;

FIG. 30 is a view showing still another example of the same as in FIG. 28;

FIG. 31 is a view showing an example of operating button make-up displayed in hierarchical relationship on a display unit;

FIG. 32 is a view showing another example of the same as in FIG. 31;

FIG. 33 is a view showing the sixth example of operating button make-up displayed on a display unit;

FIG. 34 is a view showing a switching correlation of operating buttons displayed under various specifications on a display unit;

FIG. 35 is a view showing the format of multimedia information button table for each button class;

FIG. 36 is a view showing an example of the format of button information code setting forth the type, output characteristic and condition of multimedia information;

FIG. 37 is a view showing the format of multimedia information button table for each individual button;

FIG. 38 is a view showing an example of multimedia information button table for a button class;

FIG. 39 is a view showing an example of multimedia information button table for each individual button;

FIG. 40 is a view showing an example of self-diagnosis data processing based on values of data stored in a memory;

FIG. 41 is a view showing an example of data monitoring reference table; and

FIG. 42 is a view showing an example of operating button make-up displayed after self diagnosis on a display unit.

BEST MODE FOR CARRYING OUT THE INVENTION

Figure 7A:
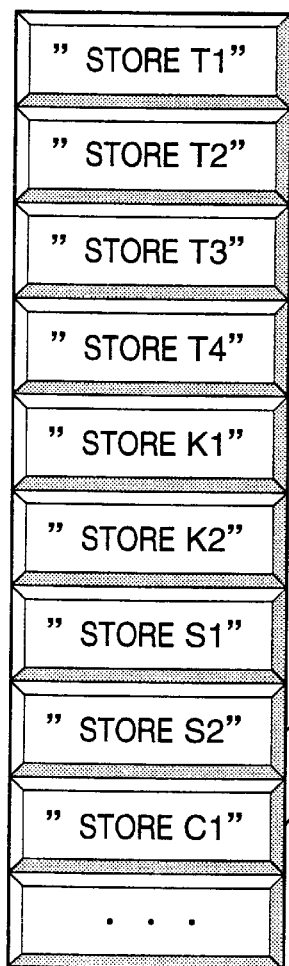
FIG. 7 is a view showing an example of manner in which a new individual button is defined from operating buttons displayed on a display unit and multiplied.

Embodiments of the present invention will be described below with reference to the appended drawings.

Referring to FIG. 1, the system for use in carrying out the present invention consists mainly of a display 1 as a display unit for displaying operating buttons, an input unit 2 such as a keyboard, a mouse, a touch panel or a pen for inputting selection and direction on the operating buttons displayed on the display (display unit) 1, a memory 3 provided with a memory or disk adapted to store data to be processed and operating buttons composed of button classes, button groups and individual buttons, and a computer (central processing unit) 4 capable of controlling the above devices and executing processing corresponding to selection and direction on the operating buttons.

FIG. 2 shows an example of data structure together with data values stored in the memory 3. Each of data 1, data 2 and so forth consists of a plurality of fields such as field 1, field 2 and so forth. Of these fields, for example, field 1 stores "Tokyo" or "Osaka", field 2 stores "store T1" or "store T2", field 3 stores "commodity A" or "commodity B", field 4 stores "foodstuff" or "cosmetic", field 5 stores "550" or "150" as "budget" (unit: one million yen) among sales data, and field 6 stores "526" or "162" as "result" (unit: one million yen) among sales data.

As many data values as the number of data exist by very data-composing field, and the number of fields and the sequence of field arrangement are identical through all the data. The following description will be made providing that each date consists of six fields (field 1 to field 6) and that a total of 20 data (data 1 to data 20) are present.

Referring to FIGS. 3 to 5, it will be described how to not only enable the user to readily instruct the computer on processing within a short period of time on the basis of the above data, in particular, on the basis of the latest data stored without the need of separately developing operation-related software but also facilitate maintenance.

First, the data stored in the memory 3 is displayed on the display unit 1 and a field is selected and directed with the use of the input unit 2 to thereby automatically set a button class corresponding to the field selected and directed. Alternatively, a categorical field is automatically identified from the data values stored in the memory 3 and a button class corresponding to the identified field is automatically set. The terminology "categorical field" used herein means a field of other than that of a numerical value such as amount or quantity.

In this embodiment, field 1, field 2, field 3 and field 4 are selected and directed with the use of the input unit 2. Alternatively, without conducting such selection and direction, field 5 and field 6 are automatically identified as numerical value fields and the other fields, i.e., fields 1, 2, 3 and 4 are automatically identified as categorical fields. Then, as shown in FIG. 3(b), fields 5 and 6 are excluded to fall outside button generation objects and button classes 1, 2, 3 and 4 are automatically set corresponding to fields 1, 2, 3 and 4.

With respect to the button classes 1 to 4, the button class designations are entered with the use of the input unit 2 and stored. However, the designations may be stored in another method, or they may automatically be given by programming and stored. For example, as shown in FIG. 3 (b), the designation for button class 1 corresponding to field 1 is "district", the designation for button class 2 corresponding to field 2 is "store", the designation for button class 3 corresponding to field 3 is "commodity", and the designation for button class 4 corresponding to field 4 is "department".

When the button classes are hierarchically correlated, the button class designations are displayed on the display unit 1 and selected in the hierarchically descending sequence of button class with the use of the input unit 2. The selection sequence per se is referred to as the hierarchical level. That is, herein, when the button class designations displayed on the display unit 1 are selected in the descending sequence: "district" and "commodity" with the use of the input unit 2, "district" is the upper level and "commodity" the lower level. Contrarily, when selection is made in the descending sequence: "commodity" and "district", "commodity" is the upper level and "district" is the lower level. The "store" and "department" falling outside the selection are uncorrelated button classes.

Individual buttons belonging to each button class are automatically set on the basis of the data values stored in the field corresponding to the button class. FIG. 4 shows an example of display of individual buttons made for each of button class 1 and button class 3 on the display unit 1.

In this example, a unique data value per se is employed as the individual button designation. As many individual buttons as the number of unique designations are automatically set in each single group. Herein, field 1 contains data values such as "Tokyo", "Osaka" and "Aichi", so that individual buttons with these designations are automatically set as shown in FIG. 4(a). On the other hand, field 3 contains data values such as "commodity A", "commodity B" and "commodity C", so that individual buttons with these designations are automatically set as shown in FIG. 4(b).

In this example, in addition to those shown in FIG. 4, individual buttons with the designations "Hokkaido", "Fukuoka", "Kanagawa", "Saitama" and "Chiba" are automatically set in button class 1 and individual buttons with the designations "commodity D", "commodity E", "commodity F", "commodity G" and "commodity H" in button class 3 (Not shown in FIG. 4). Further, these individual buttons may have different designations, and it is feasible. to assign a unique designation to a range of data values or an aggregate of a plurality of data values and to automatically set as many individual buttons as the number of assigned designations.

When a plurality of button classes are correlated, a button group of hierarchically lower button classes correlated with individual buttons selected by a hierarchically upper button class is automatically set and switching displayed in the following manner.

That is, a certain button class is correlated hierarchically below another button class, thereby automatically setting a plurality of button groups corresponding to the certain button class in accordance with the situation of individual button selection in the other button class and effecting switching display. When there is no correlation with other button classes, a single button group is automatically set corresponding to the certain button class.

For example, when "district" of button class 1 is set hierarchically low and "commodity" of other button class 3 is correlated hierarchically above the same, the selection of individual buttons "commodity A", "commodity B" and "commodity C" of the hierarchically upper button class 3 leads to automatic setting of button group 1-1 having individual buttons with the designations such as "Tokyo", "Osaka" and "Aichi" as shown in FIG. 5(a). When only individual button "commodity A" of the hierarchically upper button class 3 is selected, the data storing "commodity A" in field 3 are, for example, data 1, data 4 and data 7 of FIG. 2. "Aichi" does not exist in the respective fields 1 of these data, so that button group 1-2 having individual button "Aichi" removed therefrom is automatically set as shown in FIG. 5(b).

Likewise, when "commodity" of button class 3 is set hierarchically low and "district" of other button class 1 is correlated hierarchically above the same, the selection of individual buttons "Tokyo", "Osaka" and "Aichi" of the hierarchically upper button class 1 leads to automatic setting of button group 3-1 having individual buttons with the designations such as "commodity A", "commodity B" and "commodity C" as shown in FIG. 5(c). When only individual button "Aichi" of the hierarchically upper button class 1 is selected, the data containing "Aichi" in field 1 is only data 6 of FIG. 2. Thus, button group 3-2 having individual button "commodity C" generated on the basis of the data value stored in field 3 of data 6 is automatically set as shown in FIG. 5(d).

Thus, data can be narrowed by free setting of hierarchical relationship.

Next, referring to FIG. 6, it will be described how the state of selection is converted and stored in the memory 3 when selection and direction are made by means of the input unit 2 with the use of the button classes and individual buttons shown in FIG. 4 and displayed on the display unit 1.

The positions of individual buttons are counted from upside in the order: 1, 2, 3 . . . , and selection and cancellation of selection are arbitrary for the individual buttons. The state of each individual button is either "being selected" or "not selected". The positions of selected individual buttons are encoded and freely concatenated among a plurality of button classes to thereby form button codes. These button codes are stored.

In this example, two-digit button codes are formed by representing by one digit each of the position from upside of individual button in button class 1 and that of individual button in button class 3 as shown in FIG. 4 and concatenating the digits in accordance with the decimal number system into numeric codes as shown in FIG. 6.

That is, selection of the first from upside individual button "Tokyo" of button class 1 and the first from upside individual button "commodity A" of button class 3 leads to button code "11". Selection of the first from upside individual button "Tokyo" and second from upside individual button "Osaka" of button class 1 and the first from upside individual button "commodity A" of button class 3 leads to button codes "11" and "12". Therefore, for example, when the button code is "11", data 1 of FIG. 2 is called from the memory 3. When the button code is "21", data 4 of FIG. 2 is called from the memory 3. The called data are processed by the computer 4.

In the above example, the button code is expressed by a numeric code concatenated in accordance with the decimal number system. However, an expression method according to needs such as 36-base or 256-base number system may be employed in storage for enhancing the efficiency of processing in the memory 3.

When the button code is stored in accordance with the 36-base number system, it is expressed by a concatenation of numeric and alphabetical codes which are "0", "1", . . . , "9", "A", "B", . . . , "Z". Herein, for example, when the button code is "7K", selection has been made of the seventh individual button of button class 1 and the 20-th individual button of button class 3. When no individual button is selected, the corresponding digit is "0".

When the button code is stored in accordance with the 256-base number system, it is expressed by a concatenation of byte codes X"00" to X"FF" according to the hexadecimal number system. Herein, for example, when the button code is X"17F0", selection has been made of the 23-rd individual button of button class 1 and the 240-th individual button of button class 3.

When the length (number of characters) of the button code agrees with the number of button classes, for example, setting 10 button classes leads also to a stored button code length (number of characters) of 10.

For example, when the button code is expressed in accordance with the 256-base number system, the combination of individual button selections in all the button classes is the tenth power of 256 even in selecting a single button within one button class. When the length (number of characters) of the button code is greater than the number of button classes, namely, when a button code of at least two characters is caused to correspond to one button class, the number of button selections can further be increased. For example, when a button code of two characters is caused to correspond to one button class in accordance with the 256-base number system, the combination of individual button selections in all the ten button classes as above is the tenth power of the second power of 256 even in selecting a single button within one button class.

The above-mentioned individual button combination is further increased when a plurality of individual buttons are selected in one button class or when a plurality of button groups are set in one button class and a single or a plurality of individual buttons are selected.

Selection and direction on retrieval and other processing treating to a vast plurality of data can be conducted by the above relationship between button class and button code.

In the above example, the operating buttons can automatically be generated on the basis of the data stored in the memory 3. Thus, the user can readily carry out the selection and direction by means of the operating buttons within a short period of time without the need of developing operation-related processing software such as a menu or buttons. Moreover, with respect to updating such as correction, change, addition and deletion of the data, the latest operating buttons can also be created only by either running an automatic updating processing or rerunning an automatic operating button generating processing with the use of latest data because a master file entry or an intramemory table definition is inherently not needed, thereby facilitating maintenance.

The conversion of the result of selection and direction to the button code and storage thereof in the memory 3 enables not only use of the button code in running computer processing as a key for fetching appropriate data from the memory 3 but also redisplay of the previously selected button in the selected state at any time even after erasure of the button display with the result that the labor for reselecting the same button can be saved to thereby simplify button manipulation.

An example of manner in which a new individual button is defined from existing individual buttons and multiplied will be described below with reference to FIGS. 7 to 9.

First, FIG. 7(a) shows the state of arrangement in which the data values of field 2 of the data shown in FIG. 2 and stored in the memory 3 are employed as they are as the designations of the individual buttons of the button class "store", in which the button group "Kanto district" is set in the button class "store", and in which the individual buttons belonging to the button group are displayed on the display unit 1.

That is, the button class "district" corresponding to field 1 is of a hierarchically upper level and the "store" corresponding to field 2 is of a hierarchically lower level. The data having the data values "Tokyo", "Kanagawa", "Saitama" and "Chiba" in field 1 among the hierarchically upper level are summarized as the button group "Kanto district" of the hierarchically lower level. Therefore, the data corresponding to data 1 to 3 and data 9 to 20 are retrieved in this button group.

Figure 7B:

Referring to FIG. 7(b), the definition of a new individual button is conducted by selecting as many arbitrary individual buttons as required from those existing buttons with the use of the input unit 2 and thereafter entering the designation of the new individual button integrating these with the use of the input unit 2. Herein, in one instance, two individual buttons "store T1" and "store T3" are selected from the existing individual buttons of the button group "Kanto district" of the button class "store" with the use of the input unit 2, and a new individual button with the designation "major store" is defined on the basis of combination of these. In another instance, three individual buttons "store K1", "store S2" and "store C1" are selected, and a new individual button with the designation "new store" is defined on the basis of combination of these.

Figure 7C:
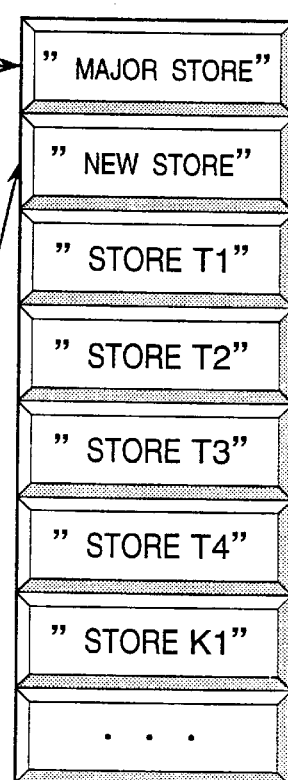

The thus defined individual buttons are multiplied in the manner that, as shown in FIG. 7(c), the new individual buttons "major store" and "new store" are disposed at an arbitrary location, for example, at the forefront of the existing individual buttons of the button group "Kanto district" of the button class "store" to display them as operating buttons and that, when the new individual button is selected, automatic emulation is performed in the memory 3 as if the above defined individual buttons were selected.

That is, FIG. 8(a) shows the state of arrangement exhibited after multiplication of the new individual buttons "major store" and "new store" as shown in FIG. 7 (c). In this state, selection of the individual button "major store" (new button) as shown in FIG. 8(b) results in emulation of the manipulation of selecting two buttons "store T1" and "store T3" in the memory 3 as shown in FIG. 8(c). Likewise, selection of the individual button "new store" (new button) results in emulation of the manipulation of selecting three buttons "store K1", "store S2" and "store C1" in the memory 3.

In the fetching of data or information under the various conditions, if the various needs are integrated under a direct designation on the basis of the existing individual buttons and a new summarizing individual button is defined and multiplied, the computer 4 can be easily instructed on the execution of processing by selection of the new individual button, thereby avoiding the need of conducting a time consuming manipulation of selecting all the series of existing individual buttons as objects of needs.

In this example, for example, when it is assumed that there are needs of fetching data or information on stores limited to those especially important with respect to sales and profit, it is satisfactory to select one new individual button "major store" integrating the stores instead of the selection of the above defined two existing individual buttons "store T1" and "store T3" as major stores. This also applies when it is assumed that there are needs of fetching data or information on sales and profit limited to those of the new stores, it is satisfactory to select one new individual button "new store" integrating the stores instead of the selection of three existing individual buttons "store K1", "store S2" and "store C1".

The above definition of a new individual button on the basis of the combination of existing individual button selections and multiplication thereof avoids the need of fully memorizing a plurality of individual button designations regarding certain conditions and making selection. Thus, the greater the number of existing individual buttons as objects, the less the manipulation labor. Further, the integration of needs under a direct designation accompanied by summarization leads to easy understanding with the result that selection errors and omissions can be prevented.

After the definition and multiplication of new individual buttons by the above method, these individual buttons can be regarded as existing individual buttons and included in the combination of existing individual button selections to thereby enable definition and multiplication of other new individual buttons. In this manner, according to necessity, new individual buttons can successively be multiplied to thereby attain further simplification of button manipulation.

FIG. 9 shows an example of definition and multiplication of a new individual button on the basis of existing individual buttons by correlating selection combinations with respect to two button classes, i.e., the above button class "store" and another button class "commodity". Herein, the button class "commodity" corresponds to field 3 of data shown in FIG. 2 as mentioned above. In this example, one button group "major classification" is set for the button class "commodity", which is expressed as an aggregate of individual buttons such as those with the designations "commodity A" and "commodity B".

In this example as well, referring to FIG. 9(b), the definition of a new individual button is conducted by selecting as many arbitrary individual buttons as required from those existing buttons with the use of the input unit 2 and thereafter entering the designation of the new individual button integrating these with the use of the input unit 2.

In this example, two individual buttons "store T1" and "store T3" are selected from the existing individual buttons of the button group "Kanto district" of the button class "store" with the use of the input unit 2. Then, individual buttons "commodity A" and "commodity B" are similarly selected from the existing individual buttons of the button group "major classification" of the button class "commodity". A new individual button with the designation "selective management object" is defined by correlating selection combinations with respect to the above two button classes.

In the multiplication of the thus defined new individual button, referring to FIG. 9(c), a button class "management item" and a button group "Kanto district" suitable for the individual button "selective management object" are newly set, wherein the individual button (new button) is displayed as an operating button. Selection of the new individual button "selective management object" leads to emulation of the manipulation of selecting four buttons, i.e., the above defined "store T1" and "store T3" of the button class "store", and "commodity A" and "commodity B" of the button class "commodity".

In this example, when, in the assumption that there are priority management needs with emphasis on stores and commodities having especially strong influence on the business result, data and information regarding the above stores and commodities are fetched, it is satisfactory to select one new individual button "selective management object" integrating the stores and commodities instead of the selection of the total of four existing individual buttons of two button classes, i.e., the above defined selective management object stores "store T1" and "store T3", and commodities "commodity A" and "commodity B".

Although, in the above examples, a new individual button has been defined and multiplied with the use of the input unit 2, also, a plurality of individual-buttons of the same button group of the same button class can be summarized on the basis of the data values stored in the memory 3 corresponding to the individual buttons and displayed.

Referring to FIG. 10, data values, profits in this example, corresponding to individual buttons of the button group "Kanto district" of the button class "store" are secured, and a plurality of individual buttons are summarized as "others" on the basis of the data values (profits) and displayed. An "individual button/corresponding data value table" shown in FIG. 10(a) is set and stored in the memory 3. In this example, the profit column of the "individual button/corresponding data value table" shows a sum of data values as profits obtained by every individual button. That is, the profit of individual button "store T1" is 150 million yen and that of "store T2" is 62 million yen. The total of the profits corresponding to all the individual buttons of the button group "Kanto district" is 600 million yen.

Referring to FIG. 10(b), a plurality of individual buttons corresponding to stores having profits whose proportion is low to the total profit among the individual buttons are summarized into one individual button with the designation "others" and redisplayed by directing the "change of display method by display summarization and its conditions" with the use of the input unit 2. This enables the user to easily select on a priority basis individual buttons corresponding to stores raising high profits.

In this example, four individual buttons "store K2", "store S1", "store S2" and "store C1" corresponding to stores each having a profit whose proportion to the total (total profit) is less than 3% are summarized into individual button "others" and displayed. Selection of individual button "others" leads to redisplay of four individual buttons prior to summarization, as shown in FIG. 10(c), to thereby enable selection of the individual buttons corresponding to low-profit stores.

Naturally, arbitrary setting can be made on summarization conditions such as "store whose profit is less than 3% of the total" of this example.

The retrieval method for fetching arbitrary data stored in the memory 3 by means of individual buttons displayed on the display unit 1 and selected and directed with the use of input unit 2 will now be described with reference to FIGS. 11 to 15.

In this example, one button group "whole country" is set with respect to button class "district" shown in FIG. 11(a). This button group is indicated as an aggregate of individual buttons such as those with the designations "Tokyo", "Osaka" and "Aichi" on the basis of the data values of field 1. Referring to FIG. 11(b), a total of eight button groups by urban and rural prefectures of field 1 such as those with the designations "Tokyo", "Osaka" and "Aichi" are set with respect to button class "store". Among them, one button group "Tokyo" is indicated as an aggregate of individual buttons such as those with the designations "store T1" and "store T2" on the basis of data values of field 2. One button group "major classification" is set with respect to button class "commodity" shown in FIG. 11(c). These individual buttons are stored in the format of an array as button data in the memory 3. They are updated in accordance with data updating and displayed as operating buttons on the display unit 1 according to necessity.

The process of creating a link table shown in FIG. 12 by correlating the data shown in FIG. 2 with the operating buttons shown in FIG. 11 will be described below.

Herein, the position of individual button selection in each button class is counted from the forefront in the order: 01, 02, . . . , and concatenated with "district", "store" and "commodity" in this sequence to thereby form a button selection pattern (each expressed in two characters) corresponding to each data.

First, data No. 001 is assigned to data 1, and the position of individual button matching the data value "Tokyo" of field 1 of the data 1 (data No. 001) is searched for in the button group "whole country" of the button class "district". It is the forefront button (01). Also, the position of individual button matching the data value "store T1" of field 2 of the data 1 is searched for in the button group "Tokyo" of the button class "store". It is also the forefront button (01). Further, the position of individual button matching the data value "commodity A" of field 3 of the data 1 is searched for in the button group "major classification" of the button class "commodity". It is also the forefront button (01). Since the data 1 should be appropriate data when "Tokyo" (01), "store T1" (01) and "commodity A" (01) have been selected for the operating button, the button selection pattern of the data 1 is "010101".

Likewise, since the data 2 should be appropriate data when "Tokyo" (01), "store T1" (01) and "commodity B" (02) have been selected for the operating button, the button selection pattern of the data 2 is "1010102".

In data 4, the individual button of the button group "whole country" of the button class "district" which matches "Osaka" of field 1 is the second from top button (02). When the individual buttons of the button group "Osaka" of the button class "store" are sequentially "store O1", "store O2", . . . although not shown, the individual button of this button class which matches the data value "store O1" of field 2 of data 4 is the forefront button (01). Thus, the button selection pattern of the data 4 is "020101". Likewise, the button selection pattern of data 5 is "020202".

The button selection pattern is set corresponding to the data value of each individual field with respect to all the data in the above manner, and a link table correlating data No. with button selection pattern is created and stored in the memory 3.

The method of expressing the position of selection of individual button is not limited to the above numeric value according to the decimal number system and is free as long as the value even if according to the binary number system or other methods can uniquely specify the position of selection. For example, the position of selection of individual button can be encoded by the 36-base or 256-base number system, as mentioned above.

When no individual button matches the data value of a field of data, the character indicating the absence of any position of selection, for example, "&&" is used in the corresponding button selection pattern. This is coped with by a later addition of individual button or implementation of processing on the condition of the absence thereof.

The following will describe fetching the data shown in FIG. 2 by means of the operating buttons shown in FIG. 11 and the link table shown in FIG. 12, which fetching can be conducted by operation substantially reverse to the above creation of the link table.

That is, the operating buttons shown in FIG. 11 are displayed on the display unit 1 and, for example, as shown by the thick line frame of FIG. 11, "Tokyo" is selected in the button class "district" of FIG. 11(a), "store T3" is selected in the button class "store" of FIG. 11(b) and "commodity C" is selected in the button class "commodity" of FIG. 11(c) with the use of the input unit 2. Then, indication of these individual button selection positions by the above button selection pattern leads to "010303" as shown in FIG. 11(d). In the link table shown in FIG. 12, the data No. having the button selection pattern matching the above to thereby identify the corresponding data is searched for. That is, in this selection, the corresponding data can be identified as data No. 009 (data 9) shown by the thick line frame in FIG. 12.

When there is a button class in which no individual button is selected, use is made of a character indicating that no selection is made at the character of the button selection pattern, for example, the expression "**". In this case, pattern comparison becomes unnecessary at that character, and any data value is satisfactory in the corresponding field.

When an updating such as addition, change, correction or deletion of data occurs after the setting of the link table as shown in FIG. 12, the link table is updated according to necessity. That is, when data is added, a button selection pattern is newly formed and added together with the added data No. to the link table. When the data is changed or corrected, the button selection pattern of the corresponding data No. is reformed and substituted for the previous button selection pattern. When data is deleted, the button selection pattern of the corresponding data No. is replaced by "000000" to thereby render it invalid. In this manner, the link table can be updated by, at the occurrence of data updating, reflecting its contents on the button selection pattern of the corresponding data No.

Although FIGS. 11 and 12 show an example in which one individual button is selected in each button class, a plurality of individual buttons can be selected in any arbitrary button class.

For example, selections of "store T1" and "store T2" in the button class "store" as shown by the thick line frame in FIG. 13(b) and selections of "commodity A" and "commodity C" in the button class "commodity" as shown by the thick line frame in FIG. 13(c) result in formation of a plurality of button selection patterns corresponding to the selections, namely, four button selection patterns "010101", "010201", "010103" and "010203" is formed in this example.

In the link table shown in FIG. 12, the data Nos. having these button selection patterns are searched for. Thus, data No. 001 (data 1) has "010101", and data No. 003 (data 3) has "010203". Although not shown in FIG. 12, data No. 013 (data 13) corresponds to "010201" and is present. However, since there is no data No. having the button selection pattern "010103", the corresponding data can be identified as being the above three.

Thus, in specifying the field value (designation) for data retrieval in this example, it is only requisite to arbitrarily select the individual button with corresponding value in each button class (operating button) displayed on the display unit 1 by means of the input unit 2.

Although in this example it has been described that the button selection pattern is formed by concatenating button classes "district", "store" and "commodity" in this order, the button selection pattern can be formed in any sequence depending on the conveniences of operation and processing as long as consistency is held between the position of selected individual button and the button class concatenation sequence at the time of forming the button selection pattern in the link table.

The arrangement of individual buttons in each button class can also be displayed in any arbitrary sequence depending on the conveniences of operation and processing such as the data input sequence, the individual button selection frequency order and the sequence (ascending or descending sequence) based on data value of corresponding field. That is, the user's manipulation can be simplified and facilitated in directing on data retrieval processing by changing the sequence and displaying with switching to a plurality of arrangements different from each other according to necessity.

FIG. 14 shows an example in which the button class "amount" corresponding to field 6 of the data shown in FIG. 2 and stored in the memory 3 is provided and one button group "rank" is set for this button class "amount" and in which this button group "rank" is represented by an aggregate of individual buttons "less than one hundred million yen", "one to three hundred million yen" and "at least three hundred million yen" to thereby enable ranking values of field 6 for identification.

If the individual button positions are counted from the forefront in the sequence: 01, 02, . . . the same as in FIG. 11 and if the button class is used as a constituent element of the button selection pattern (expressed in two characters), the corresponding data can be identified on the basis of the position of the individual button selected the same as in the above described other button classes.

For example, provided that the button selection pattern is formed by concatenating "amount" after the "district", "store" and "commodity" shown in FIG. 12, the button selection pattern corresponding to data 1 shown in FIG. 2 is "01010103" because the value of field 6 of data 1 is "560" (unit: one million yen) which corresponds to the third from top individual button "at least three hundred million yen" of the button class "amount" as shown in FIG. 14. With respect to data 2, likewise, the button selection pattern is "01010202" because the value of field 6 of date 2 is "162", which corresponds to the second from top individual button "one to three hundred million yen" of the button class. Upon setting of a link table in this manner, selection of an individual button of the button class "amount" enables identifying the corresponding data having the condition regarding amount added thereto.

Although the method of identifying corresponding data with the use of the link table shown in FIG. 12, i.e., link table directly one-to-one correlating the data No. with the button selection pattern has been described, it may be preferred to set another link table and use it depending on the data and processing characteristics such as the frequency of data updating being low while the data volume is large and the frequency of data retrieval being high with, especially, high-speed response being required.

FIG. 15 shows a link table which is the most suitable for use in the above situation. In this link table, a unique button selection pattern is used as an index and as many data Nos. corresponding to individual button selection patterns as existing are held in the same index. In this case, arranging button selection patterns in a given sequence prior to use enables more efficiently identifying corresponding data at a greater speed, for example, by searching for the button selection pattern conforming to the position of button selection by binary search.

FIGS. 16 to 21 show an example in which, when the same mutually correlated button manipulations as before are needed, repetition of the manipulations can partially or entirely be avoided depending of the user's decision at that time. FIGS. 16(a) and (b) respectively show button classes "report partition" and "store" conducting selection and direction for data retrieval in computer processing. FIG. 16(c) shows button class "management item" conducting selection and direction for executing processing based on the retrieved data.

That is, one button group "business results" is set for the button class "report partition" shown in FIG. 16 (a), and the button group "business results" is indicated as an aggregate of individual buttons such as those with the designations "daily", "weekly", "monthly" and "annual". The button class "store" shown in FIG. 16(b) is the same as that shown in FIG. 7(c). Further, one button group "summary" is set for the button class "management item" shown in FIG. 16(c), and the button group "summary" is indicated as an aggregate of individual buttons such as those with the designations "sales", "gross profit", "ratio of sales to that of the same month of the preceding year", "ratio of gross profit to that of the same month of the preceding year", "sales performance" and "gross profit performance". In this example, with respect to the selection of individual buttons, the selection among button classes is conducted in the sequence: "report partition", "store" and "management item". That is, the following description will be made providing that the individual button is selected in the button class sequence: "report partition", "store" and "management item".

Figure 17:
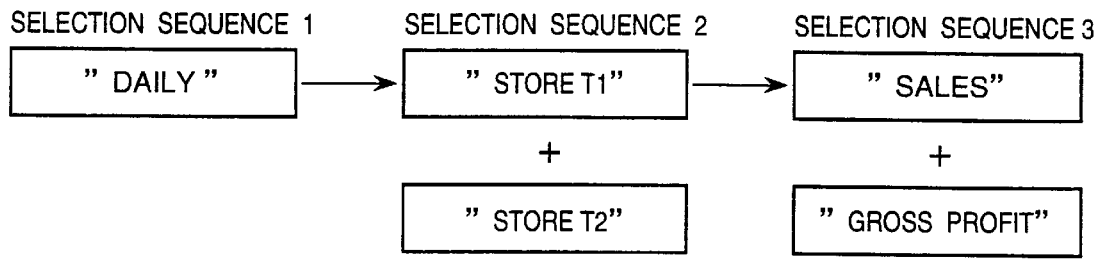
FIG. 17 is a view showing a selection sequence employed in the selection of operating buttons and an example of selected operating button make-up.
Figure 18:
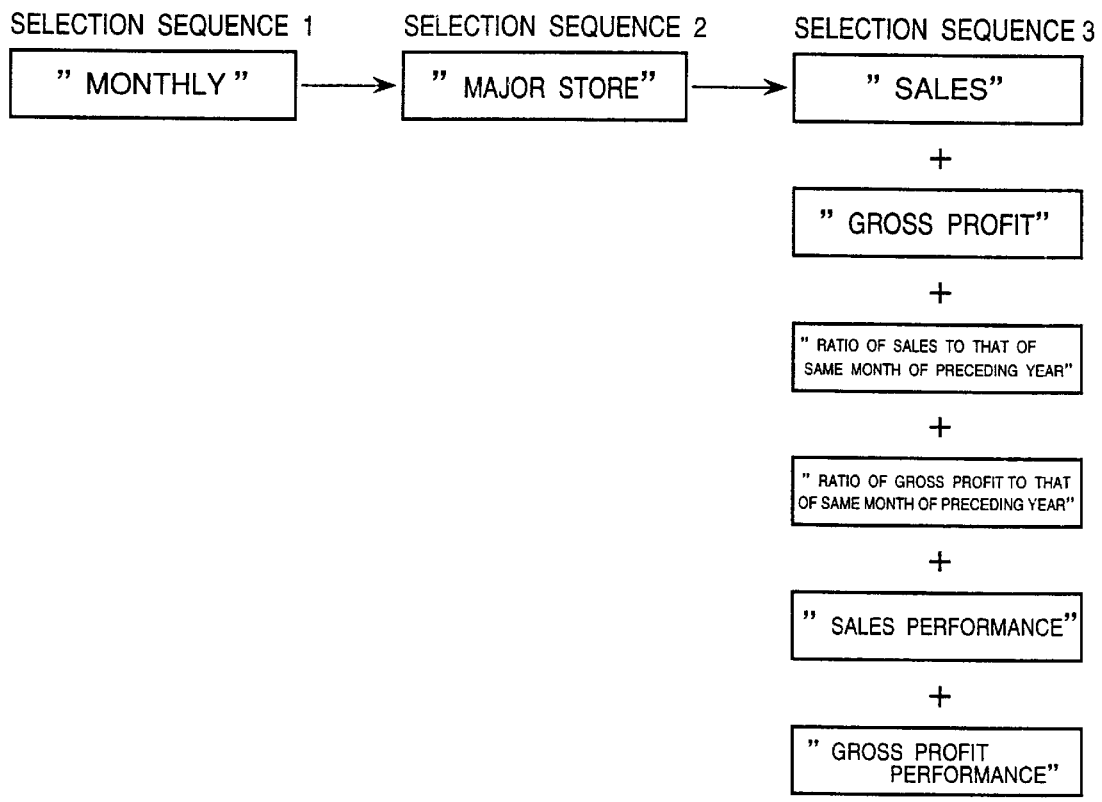
FIG. 18 is a view showing another example of the same as in FIG. 17.
Figures 19, 20:
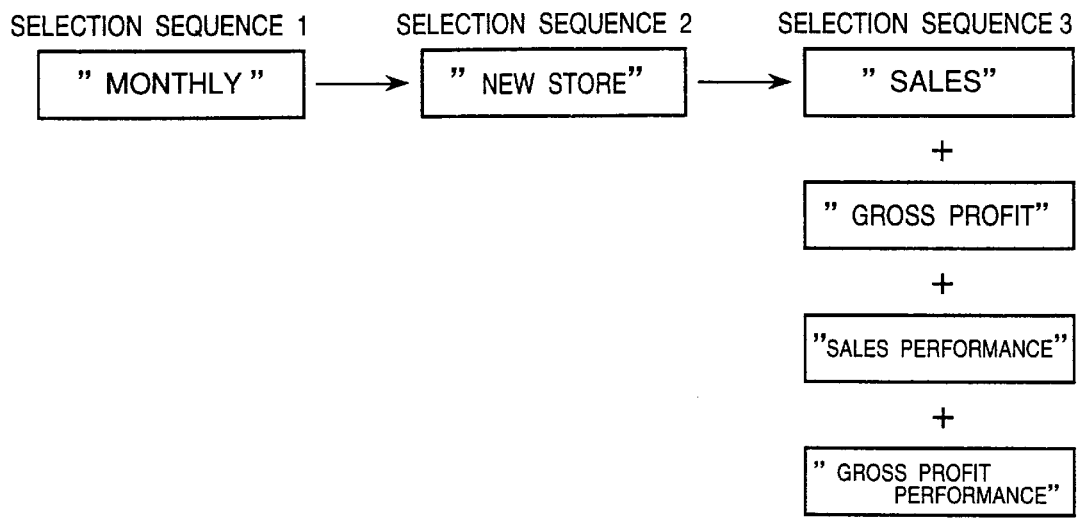
FIG. 19 is a view showing still another example of the same as in FIG. 17.
FIG. 20 is a view showing an example of the state of having a history of sequences of button manipulations of FIGS. 17 to 19 stored in a button manipulation history table.

Each of FIGS. 17 to 19 shows the operating button selection sequence during a series of button manipulations effected by displaying the operating buttons shown in FIG. 16 on the display unit 1 and sequentially selecting individual buttons and examples of selected individual buttons.

In this example, referring to FIG. 17, the selection sequence 1 selects individual button "daily" of the button group "business results" of the button class "report partition"; the selection sequence 2 selects individual buttons "store T1" and "store T2" of the button group "Kanto district" of the button class "store"; and the selection sequence 3 selects individual buttons "sales" and "gross profit" of the button group "summary" of the button class "management item". Likewise, referring to FIG. 18, the selection sequence 1 selects individual button "monthly"; the selection sequence 2 selects individual button "major store"; and the selection sequence 3 selects individual buttons "sales", "gross profit", "ratio of sales to that of the same month of the preceding year", "ratio of gross profit to that of the same month of the preceding year", "sales performance" and "gross profit performance". Further, referring to FIG. 19, the selection sequence 1 selects individual button "monthly"; the selection sequence 2 selects individual button "new store"; and the selection sequence 3 selects individual buttons "sales", "gross profit", "sales performance" and "gross profit performance".

The state of storing a manipulation history in a button manipulation history table set in the memory 3 on the basis of the above individual button selecting manipulations shown in FIGS. 17 to 19 will now be described with reference to FIG. 20.

This button manipulation history table consists of a column of history numbers provided with consecutive numbers, a manipulation history column on which the manipulation history is sequentially written and stored and a latest position column in which a latest position mark, e.g., "♦" is provided. In this table, the history No. 1 corresponds to a sequence of button manipulations shown in FIG. 17; the history No. 2 corresponds to a sequence of button manipulations shown in FIG. 18; and the history No. 3 corresponds to a sequence of button manipulations shown in FIG. 19.

That is, the above each manipulation history is one obtained by selecting individual buttons of the button classes "report partition", "store" and "management item" in this order and indicating the selection sequence among the button classes and the position of selection in each button class while correlating them. The sign of inequality (>) delimits button classes and the digit indicates the position of selection of individual button counted from top in the sequence: 01, 02, . . . . When a plurality of individual buttons are selected in a single button class, the selection positions are delimited by commas (,) and arranged.

For example, the manipulation history of the history No. 1 shown in FIG. 20 corresponds to a series of button manipulations shown in FIG. 17 and indicates sequential manipulations of selecting first individual button "daily" (01) of the button class "report partition", secondly individual buttons "store T1" (03) and "store T3" (04) of the button class "store" and thereafter individual buttons "sales" (01) and "gross profit" (02) of the button class "management item".

The thus set button manipulation history table has the latest position in which the mark "♦" is constantly marked at the latest manipulation history position and stored it, and is updated by adding the history No. and the manipulation history whenever a new selecting manipulation is conducted. Incidentally, the history of having none selected is identified by, for example, inserting "00".

In the example shown in FIG. 20, the history No. 3 is located at the latest position. Up to 1000 manipulation histories can be stored. When this table is fully filled, namely, when the history No. is 1001 in this example, a return to the forefront of the table and then overwriting are effected to thereby update the table. Sequential like overwritings are effected thereafter. Up to 1000 latest manipulation histories can constantly be stored and managed in this example.

Before the complete filling of the button manipulation history table, character indicating emptiness, for example, "α" can be inserted in the manipulation history column so as to enable identifying the absence of manipulation history thereafter with the result that the range of retrieval of manipulation history can be reduced as follows.

The following will describe an example in which, in a later button manipulation, individual buttons of an identical correlated button class are redisplayed in a previously selected state on the display unit 1 with the use of the button manipulation history table shown in FIG. 20.

With respect to the manipulation history retrieving sequence, one-by-one retroactive retrieval is implemented starting with the latest manipulation history marked with "♦" in the latest position column until an identical correlated manipulation is found. When the identical correlated manipulation is found, the individual buttons are redisplayed in a previously selected state on the basis of its manipulation history. When the retrieval comes to the forefront of the button manipulation history table, a return is effected to the last and again one-by-one retroactive retrieval is implemented. Either if character indicating emptiness of manipulation history, for example, "α" is found or if a return is again made to the latest manipulation history where retrieval has been initiated, it is decided that there is none applicable and the retrieval is terminated.

Figure 21A:
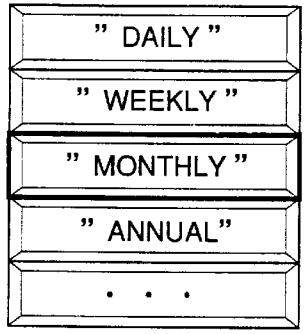
FIG. 21 is a view showing the state of having individual buttons of an identical correlated button class redisplayed in previously selected form on the basis of the button manipulation history table of FIG. 20.

The following will describe in what procedure the identical correlated manipulation history is found on the assumption that, referring to FIG. 21(a), the individual button "monthly" shown by the thick line in FIG. 21(a) among the operating buttons of the button group "business results" of the button class "report partition" displayed on the display unit 1 has been selected with the use of the input unit 2.

Figure 21B:
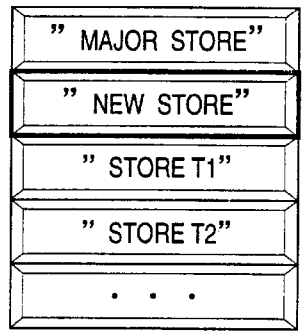

Reference to the manipulation history of the history No. 3 put at the latest position of the button manipulation history table, the position of selection for the forefront button class "report partition" is "03" which conforms to the position of above selected individual button "monthly". Therefore, it is decided that the history No. 3 is the correlated manipulation identical with the present manipulation. Now, the position of selection is studied for the next (second) positioned button class "store" in the manipulation history of the history No. 3. Its value is "02", showing the selection of "new store". Then, this individual button is redisplayed in a selected state as shown in FIG. 21(b).

Figure 21C:
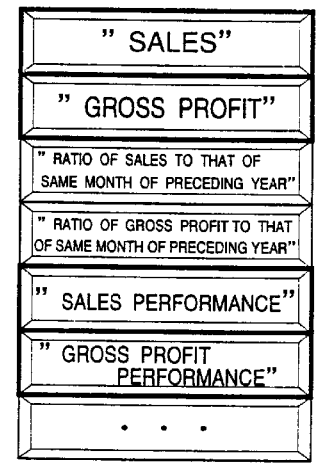

Subsequently, the position of selection is studied for the third positioned button class "management item" in the manipulation history of the history No. 3. Its values are "01", "02", "05" and "06", showing the selections of "sales", "gross profit", "sales performance" and "gross profit performance". Then, these individual buttons are redisplayed in selected states as shown in FIG. 21(c).

Thus, the user can instruct on the execution of processing in the same state of selection as before only by selecting the individual button "monthly" of the button class "report partition" without the need of selecting the respective individual buttons of the button class "store" and button class "management item".

Now, an example in which the selection of the individual button has been switched from "new store" to "major store" in the button class "store" will be described.

Herein, a history No. is searched for which has the same correlated button classes as in the state of selecting. individual button "monthly" (03) of the button group "business results" of the button class "report partition" and further individual button "major store" (01) of the button group "Kanto district" of the button class "store".

The history No. 3 is placed at the latest position of the button manipulation history table. The retrieval is retroactively initiated at the one preceding history No. That is, the retrieval is initiated at the history No. 2, and a history No. having the manipulation history of selections of "monthly" and "major store" is searched for with respect to the individual buttons of the button classes "report partition" and "store".

In the manipulation history of the history No. 2, the position of selection for the forefront button class "report partition" is "03", showing the selection of "monthly", and the position of selection for the next (second) button class "store" is "01", showing the selection of "major store". Since these conform to the state of selection as the retrieval object, it is decided that this history No. 2 is the identical correlated manipulation. Then, the position of selection for the next (third) positioned button class "management item" is studied in the manipulation history of the history No. 2. Its values are "01", "02", "03", "04", "05" and "06", showing the selections of "sales", "gross profit", "ratio of sales to that of the same month of the preceding year", "ratio of gross profit to that of the same month of the preceding year", "sales performance" and "gross profit performance". Then, these individual buttons are redisplayed in selected states.

Thus, the user can instruct on the execution of processing in the same state of selection as before only by switching the selection of the individual buttons of the button class "store" from "new store" to "major store" without the need of selecting the individual buttons (six in this example) of the button class "management item".

When, for example, only one button manipulation is conducted, the manipulation history thereof can be cleared without storing it by setting a storage mode and by storing the above manipulation history in the button manipulation history table at the selection of the mode after a sequence of button manipulations, for example, by pressing the mode button.

FIGS. 22 to 26 show another example in which the button manipulation can be conducted under the optimum conditions for the user engaged in the manipulation by displaying the individual buttons in their optimum states. In this example, the operating buttons shown in FIGS. 22 (*a*) and (*b*) correspond to those shown in FIGS. 11(*a*) and (*c*), respectively. The following description will be made on the assumption that there are no other operating buttons, that is, data 1 to 7 among the data shown in FIG. 2 are stored in the memory 3.

In this example, referring to FIG. 23 the display sequence and display sizes of individual buttons among the same button group of the same button class are changed according to individual button selection frequencies. An "individual button selection frequency table" as shown in FIG. 23(*a*) is set and stored in the memory 3. A selection frequency column of the "individual button selection frequency table" exhibits the individual button selection frequency which increases by one every time the individual button is selected.

The table of this example shows that individual buttons "Tokyo", "Osaka", "Aichi" and "Hokkaido" have been selected 12, 7, 25 and 6 times, respectively, in the computer processing.

A "change of display sequence according to selection frequency" is directed by means of, for example, a button with the use of the input unit 2 so that the display sequence of individual buttons is rearranged in the descending order of use frequency and redisplayed as shown in FIG. 23(*b*). Thus, the most frequently selected individual button "Aichi" is displayed at the forefront (topmost). As a result, the user can find the individual buttons whose selection frequencies are high easily.

A "change of display size according to selection frequency" is directed by means of, for example, a button with the use of the input unit 2 so that the display sizes of individual buttons are redisplayed in proportion to selection frequencies as shown in FIG. 23(*c*). Thus, the most frequently selected individual button "Aichi" is displayed at the forefront (topmost) in the greatest size. As a result, the user can select the individual buttons whose selection frequencies are high at a greater speed.

FIGS. 23(*d*) and (*e*) show the reverse state in the direction sequence shown in FIGS. 23(*b*) and (*c*). That is, FIG. 23(*d*) shows the state of first having individual buttons changed in display sizes by directing the change of display size and then redisplayed. On the other hand, FIG. 23(*e*) shows the state of thereafter having the individual buttons changed in the display sequence by directing the change of individual button display sequence and then redisplayed (identical with the state of FIG. 23(*c*)).

Although both the display sequence and display sizes of individual buttons among the same button group of the same button class can be changed and displayed in the above manner, naturally, only either the individual button display sequence or display sizes may be changed to thereby result in the displays as shown in FIGS. 23(*b*) and (*d*).

FIG. 24 shows an example in which the display sequence and display sizes of individual buttons among the same button group of the same button class are changed according to the data values stored in the memory 3 corresponding to the individual buttons and displayed.

That is, in this example, the data value, sales here, corresponding to each individual button of the button group "whole country" of the button class "district" as shown in FIG. 22(*a*) is secured, and the display sequence and display size of each individual button are changed on the basis of the data value (sales) and displayed. An "individual button/corresponding data value table" as shown in FIG. 24(*a*) is set and stored in the memory 3.

In this example, the sales column of the "individual button/corresponding data value table" exhibits the sum by every individual button of the values as sales of field 6 of the data (data 1 to 7) shown in FIG. 2.

Illustratively, the sales "868" corresponding to individual button "Tokyo" represent the sum of values of field 6 "526", "162" and "180" of data 1, 2 and 3, respectively, whose field 1 recitations are "Tokyo". The sales "124" corresponding to individual button "Osaka" represent the sum of values of field 6 of data 4 and 5, respectively, whose field 1 recitations are "Osaka". With respect to each of individual buttons "Aichi" and "Hokkaido" as well, the sales represent the sum of values of field 6 of the data whose field 1 recitations are the concerned district.

Referring to FIG. 24(b), the display sequence of individual buttons can be rearranged in the order of sales amount and redisplayed by directing "change of display sequence according to sales" with the use of the input unit 2 by means of, for example, a button. Thus, "Tokyo" whose sales are the greatest can be displayed at the forefront (topmost), thereby the user can find the individual button whose sales are great easily.

Further, a "change of display size according to sales" is directed by means of, for example, a button with the use of the input unit 2 so that the display sizes of individual buttons are redisplayed in proportion to sales as shown in FIG. 24(c). Thus, individual button "Tokyo" whose sales are the greatest can be displayed at the forefront (topmost) in the largest size, thereby enabling the user to more quickly find individual button whose sales are great.

As shown in FIGS. 23(d) and (e), the direction sequence can be reversed and, naturally, only either the display sequence or the display size can be changed.

FIG. 25 shows an example in which the display sequence of individual buttons among the same button group of the same button class is changed and displayed according to the use's arbitrary specification.

Figure 22A:
FIG. 22 is a view showing the fourth example of operating button make-up displayed on a display unit.
Figure 22B:
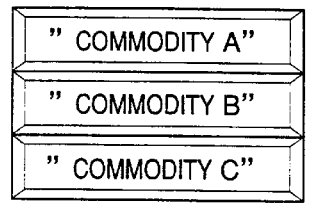

That is, in this example, the position of display of each individual button of the button group "whole country" of the button class "district" shown in FIG. 22(a) can arbitrarily be specified by the user. An "individual button display position table" as shown in FIG. 25(a) is set and stored in the memory 3. The numeric value obtained by counting the display position from the top in the order: 01, 02, . . . is entered in a display position column of this "individual button display position tablet".

Referring to FIG. 25(b), the display sequence of individual buttons can be rearranged and redisplayed in accordance with specified display position by directing "change of display sequence by specifying display position" with the use of the input unit 2 by means of, for example, a button. Thus, in this example, the display is made in the order from the north on map: "Hokkaido" (01), "Tokyo" (02), "Aichi" (03) and "Osaka" (04) to thereby enable facilitating finding of the position of individual button geographically.

FIG. 26 shows an example in which the display sizes of individual buttons are changed between button classes different from each other according to the cumulative individual button selection frequency of respective button class and displayed. That is, in this example, with respect to the button class "district" shown in FIG. 22(a) and the button class "commodity" shown in FIG. 22(b), the display sizes of individual buttons are changed between the button classes according to the cumulative individual button selection frequency of respective button class and displayed. A "cumulative selection frequency by every button class table" shown in FIG. 26(a) is set and stored in the memory 3.

A cumulative selection frequency column of the "cumulative selection frequency by every button class table" exhibits the cumulative selection frequency of the button class of selected individual button which increases by one every time the individual button is selected. The table of this example shows that the individual buttons of the button class "district" have been selected 50 times in total and the individual buttons of the button class "commodity" 25 times in total in the computer processing.

Further, a "change of display size according to cumulative button class selection frequency" is directed by means of, for example, a button with the use of the input unit 2 so that the display sizes of individual buttons of each button class are redisplayed in proportion to the above cumulative selection frequency as shown in FIG. 26 (b). Thus, in this example, the button class "district" is displayed in a size twice as large as that of the button class "commodity", thereby enabling the user to easily find the button class used in high frequency and to easily select individual buttons thereof.

Likewise, although not shown, a "change of display sequence according to cumulative button class selection frequency" may be directed with the use of the input unit 2, thereby enabling rearranging the button classes per se in the order of cumulative selection frequency in the direction from left to right on the display (display unit) 1 and redisplaying the rearranged button classes. Further, the user arbitrarily specifies the display position of each button class, and a "button class display position table" similar to the "individual button display position table" shown in FIG. 25(a) is set and stored in the memory 3, based on which the button class per se can be redisplayed in the desired position.

In the above manner, the user can impart direction with the use of the input unit 2 so as to redisplay the operating buttons in the state felt by himself as being convenient at any time and can change the state of display, thereby optimizing the display of operating buttons.

After the direction, a "retention" can be instructed with the use of the input unit 2 so as to store in the memory 3 the up-to-date directions, on the basis of which the operating buttons are redisplayed. Then, thereafter, the operating button selecting manipulation can be conducted from this state automatically with the result that the user can direct the computer 4 on the execution of processing by easy button manipulations flexibly corresponding to constantly changing information needs.

FIGS. 27 to 32 show examples in which, on the basis of data values of each field of data and selected individual button, individual buttons of another button class correlated through data with the selected individual button are automatically extracted and redisplayed to thereby enable the user to easily conduct data retrieval by permitting associative thinking.

Figure 27A:
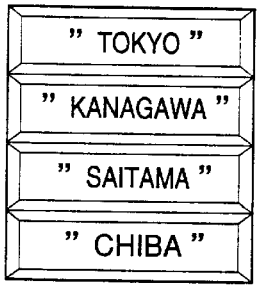
FIG. 27 is a view showing the fifth example of operating button make-up displayed on a display unit.
Figure 27B:
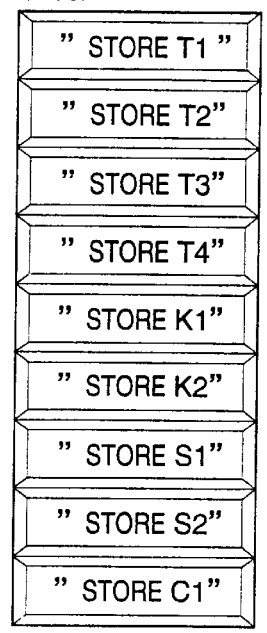
Figure 27C:
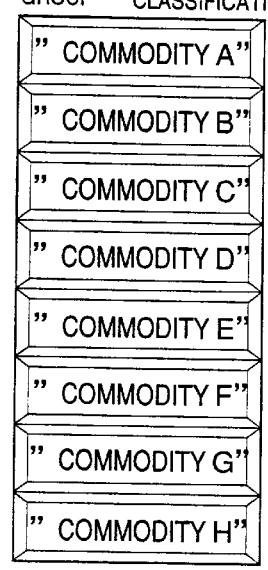

In these examples, either "parallel correlation" which displays operating buttons in parallel correlation or "hierarchical correlation" which displays operating buttons in hierarchical correlation can be directed with the use of the input unit 2. FIGS. 28–30 and FIGS. 31–32 show button manipulations made in directing "parallel correlation" and "hierarchical correlation", respectively. The following description will be made on the assumption that, in these examples, button group "Kanto" adapted to retrieve only data having data values "Tokyo", "Kanagawa", "Saitama" and "Chiba" in field 1 thereof is set for each of the button classes "district" and "store" as shown in FIG. 27, i.e., on the assumption that only data 1 to 3 and 9 to 20 are retrieved.

First, FIG. 28 shows an example of how, when an individual button of the button group "Kanto" of the button class "district" is selected, individual buttons of other button classes "store" and "commodity" are extracted on the basis of the selected individual button and how the button group thereof is changed and redisplayed.

Figure 28A:
FIG. 28 is a view showing an example of operating button make-up displayed in parallel relationship on a display unit.

Specifically, when individual button "Tokyo" of the button group "Kanto" of the button class "district" is selected as shown by the thick line frame in FIG. 28(a), the button class "district" corresponds to field 1 of the data shown in FIG. 2 and the data whose data value of field 1 matches "Tokyo" are data 1 to 3, 9, 10 and 12 to 16.

Then, these data are retrieved and, on the basis of field 2 data value for other (other than field 1) button class "store" and field 3 data value for other button class "commodity" of the retrieved data, individual buttons of these button classes are extracted and redisplayed. Simultaneously, button groups of these button classes are changed and redisplayed on the basis of the extracted individual button "Tokyo".

Figure 28B:
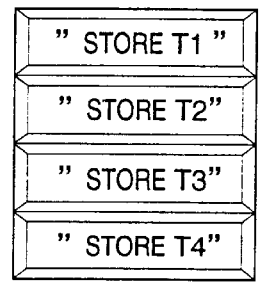
Figure 28C:
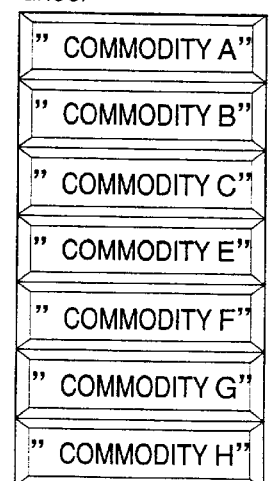

That is, with respect to the button class "store", referring to FIG. 28(b), button group "Tokyo" is set on the basis of the selected individual button "Tokyo" and, on the basis of field 2 data values of data 1–3, 9, 10 and 12–16, individual buttons "store T1", "store T2", "store T3" and "store T4" corresponding thereto are extracted and redisplayed. Likewise, with respect to the button class "commodity", referring to FIG. 28(c) button group "Tokyo" is set on the basis of the extracted individual button "Tokyo" and, on the basis of field 3 data values of these data, for example, individual buttons "commodity A", "commodity B" and "commodity C" corresponding thereto are extracted and redisplayed.

FIG. 29 shows an example of how, when an individual button of the button group "Kanto" of the button class "store" is selected, individual buttons of other button classes "district" and "commodity" are extracted on the basis of the selected individual button and how the button group thereof is changed and redisplayed.

Specifically, when individual button "store T2" of the button group "Kanto" of the button class "store" is selected as shown by the thick line frame in FIG. 28(b), the button class "store" corresponds to field 2 of the data shown in FIG. 2 and the data whose data value of field 2 matches "store T2" are data 3, 13 and 14. Then, these data are retrieved and, on the basis of field 1 data value corresponding to other (other than field 2) button class "district" and field 3 data value corresponding to other button class "commodity" of the retrieved data, individual buttons of these button classes are extracted and redisplayed. Simultaneously, button groups of these button classes are changed and redisplayed on the basis of the selected individual button "store T2".

That is, with respect to the button class "district", referring to FIG. 29(a) button group "store T2" is set on the basis of the selected individual button "store T2" and, on the basis of field 1 data value of the then retrieved data, individual button "Tokyo" corresponding thereto is extracted and redisplayed. Likewise, with respect to the button class "commodity", referring to FIG. 29(c) button group "store T2" is set on the basis of the selected individual button "store T2" and, on the basis of field 3 data value of the retrieved data, individual buttons "commodity A", "commodity C" and "commodity G" corresponding thereto are extracted and redisplayed.

FIG. 30 shows an example of how, when an individual button of the button group "major classification" of the button class "commodity" is selected, individual buttons of other button classes "district" and "store" are extracted on the basis of the selected individual button and how the button group thereof is changed and redisplayed.

Specifically, when individual button "commodity A" of the button group "major classification" of the button class "commodity" is selected as shown by the thick line frame in FIG. 30(c), the button class "commodity" corresponds to field 3 of the data shown in FIG. 2 and the data whose data value of field 3 matches "commodity A" are data 1, 11, 13 and 17 (data 4 and 7 are excluded because they do not fall under the scope of "Kanto district").

Then, these data are retrieved and, on the basis of field 1 data value corresponding to other (other than field 3) button class "district" and field 2 data value corresponding to other button class "store" of the retrieved data, individual buttons of these button classes are extracted and redisplayed. Simultaneously, button groups of these button classes are changed and redisplayed on the basis of the selected individual button "commodity A".

That is, with respect to the button class "district", referring to FIG. 30(a) button group "commodity A" is set on the basis of the selected individual button "commodity A" and, on the basis of field 1 data value of the then retrieved data, individual buttons "Tokyo" and "Kanagawa" corresponding thereto are extracted and redisplayed. Likewise, with respect to the button class "store", referring to FIG. 30(b) button group "commodity A" is set on the basis of the selected individual button "commodity A" and, on the basis of field 2 data value of the retrieved data, individual buttons "store T1", "store T2", "store K1" and "store K2" corresponding thereto are extracted and redisplayed.

Although in the above examples selection of one individual button of one button class is instantaneously accompanied by extraction and redisplay of individual buttons of another button class, it is feasible to have selection of a plurality of individual buttons accompanied by extraction and redisplay of individual buttons of another button class.

Illustratively, for example, when not only a selectable single selection mode and plural selection mode but also a redisplay button is provided, although selection of the single selection mode leads to the same instantaneous extraction and redisplay of individual buttons of another button class as in the above examples, in contrast, selection of the plural selection mode enables conducting selection of a plurality of individual buttons of one button class or selection of a plurality of individual buttons across a plurality of button classes followed by extraction of individual buttons of another button class and thereafter redisplay by extracting individual buttons of another button class when a plurality of individual buttons are selected followed by selection of the redisplay button or whenever individual buttons are selected.

When a plurality of individual buttons are selected as mentioned above, the selected individual buttons are mutually in "or" relationship. For example, referring to FIG. 27, when individual buttons "Tokyo" and "Kanagawa" of the button group "Kanto" of the button class "district" are selected, data whose field 1 data value matches "Tokyo" or "Kanagawall", namely, data 1 to 3 and 9 to 17 are retrieved and individual buttons of button classes "store" and "commodity" corresponding to the field 2 and field 3 data values of these data are extracted.

The method of automatic extraction and display of operating buttons conducted when "parallel correlation" is directed has been described. Now, examples in which "hierarchical correlation" is directed will be described with reference to FIGS. 31 and 32.

FIG. 31 shows an example of how, when "hierarchical correlation" is directed with the use of the input unit 2 on the basis of the operating buttons shown in FIG. 27 and when, subsequently, direction is conducted with the button classes arranged in the hierarchically descending sequence: "district"—"store"—"commodity", individual buttons of a hierarchically low button class are extracted and how the button group thereof is changed and redisplayed.

That is, providing that individual button "Saitama" of the button group "Kanto" of the hierarchically topmost button class "district" as shown by the thick line frame in FIG. 31(a) is selected, while this button class "district" being corresponding to field 1 of the data shown in FIG. 2, the data whose field 1 data value matches "Saitama" are data 18 and 19. Then, these data 18 and 19 are retrieved, and not only are individual buttons of the button class "store" extracted and redisplayed on the basis of the data value of field 2 corresponding to the button class "store" being a hierarchy next (second) to the retrieved data but also the button group of the button class "store" is changed and redisplayed on the basis of the selected individual button "Saitama". That is, referring to FIG. 31 (*b*), not only is the button group "Saitama" set on the basis of the selected individual button "Saitama" but also, on the basis of the data values of field 2 of data 18 and 19, individual buttons "store S1" and "store S2" corresponding to these data values are extracted and redisplayed.

Subsequently, providing that individual button "store S2" of the button group "Saitama" of the hierarchically second button class "store" as shown by the thick line frame in FIG. 31(*b*) is selected, while this button class "store" being corresponding to field 2 of the data shown in FIG. 2, the data whose field 2 data value matches "store S2" is only data 19. Then, this data 19 is retrieved, and not only is individual button of the button class "commodity" extracted and redisplayed on the basis of the data value of field 3 corresponding to the button class "commodity" being a hierarchy next (third) to the retrieved data 19 but also the button group of the button class "commodity" is changed and redisplayed on the basis of the selected individual button "store S2". That is, referring to FIG. 31(*c*), not only is the button group "store S2" set on the basis of the selected individual button "store S2" but also, on the basis of the data value of field 3 of data 19, individual button "commodity D" corresponding to this data value is extracted and redisplayed.

FIG. 32 shows an example of how, when "hierarchical correlation" is directed with the use of the input unit 2 on the basis of the operating buttons shown in FIG. 27 and when, subsequently, direction is conducted with the button classes arranged in the hierarchically descending sequence: "commodity"—"district"—"store", individual buttons of a hierarchically low button class are extracted and how the button group thereof is changed and redisplayed.

That is, providing that individual button "commodity A" of the button group "major classification" of the hierarchically topmost button class "commodity" as shown by the thick line frame in FIG. 32(*c*) is selected, while this button class "commodity" being corresponding to field 3 of the data shown in FIG. 2, the data whose field 3 data value matches "commodity A" are data 1, 11, 13 and 17. Then, these data are retrieved, and not only are individual buttons of the button class "district" extracted and redisplayed on the basis of the data value of field 1 corresponding to the button class "district" being a hierarchy next (second) to the retrieved data but also the button group of the button class "district" is changed and redisplayed on the basis of the selected individual button "commodity A". That is, referring to FIG. 32(*a*), not only is the button group "commodity A" set on the basis of the selected individual button "commodity A" but also, on the basis of the data values of the then retrieved data, individual buttons "Tokyo" and "Kanagawa" corresponding to these data values are extracted and redisplayed.

Subsequently, providing that individual button "Kanagawa" of the button group "commodity A" of the hierarchically second button class "district" as shown by the thick line frame in FIG. 32(*a*) is selected, while this button class "district" being corresponding to field 1 of the data shown in FIG. 2, the data whose field 1 data value matches "Kanagawa" are data 11 and 17. These data 11 and 17 are retrieved because both are included in the data retrieved in the upper hierarchy, and not only are individual buttons of the button class "store" extracted and redisplayed on the basis of the data value of field 2 corresponding to the button class "store" being a hierarchy next (third) to the retrieved data but also the button group of the button class "store" is changed and redisplayed on the basis of the selected individual button "Kanagawa". That is, referring to FIG. 32(*b*), not only is the button group "Kanagawa" set on the basis of the selected individual button "Kanagawa" but also, on the basis of the data values of field 2 of data 11 and 17, individual buttons "store K1" and "store K2" corresponding to these data values are extracted and redisplayed.

As mentioned above, for example, not only a selectable single selection mode and plural selection mode but also a redisplay button can be provided to thereby enable selection of a plurality of individual buttons of one button class followed by extraction and redisplay of individual buttons of another button class.

The operating button displaying methods on "parallel correlation" and "hierarchical correlation" have been described. The above methods enable redisplaying other correlated individual buttons whenever an individual button is selected on the basis of then data dynamically concatenated with the selected individual button, so that the user can advance data retrieval while arbitrarily selecting operating buttons with problems and tasks being consecutively associated with each other depending upon correlation of a plurality of data.

FIGS. 33 to 39 show examples in which operating buttons are displayed by means of not only character strings but also a variety of multimedia information outputs switched therefrom to thereby enable the user to more easily select operating buttons.

FIGS. 33(*a*) and (*c*) show the same states as those of FIG. 28(*b*) and FIG. 27(*c*), respectively. FIG. 33(*b*) illustrates the button class "department" corresponding to field 4 of the data, in which button group "major department" is set and in which the state of representing the data values of field 4 of the data per se as individual button designations is shown. The operating button is identified by disposing the character string at the button top (top face of button, applicable below), as shown in FIG. 33. The following will describe how this is switched to another output.

FIG. 34 shows the relationship between character display buttons and various multimedia information output buttons. FIG. 35 defines a multimedia information output specification which is common to all the individual buttons of the button class for every button class of operating buttons shown in FIG. 33 and shows the format of each button class MMBT set and stored in the memory 3. Herein, MMBT is the abbreviation for multimedia information button table, and each element constituting the multimedia information output specification is indicated by enclosing the same with "<" and ">". These apply below. The above button class MMBT consists of three elements <button class id>, <button information code> and <individual button MMBT reference by every button group> per button class, and is consecutively arranged in a number as large as that of button classes.

The principal object of this button class MMBT is to define a multimedia information output specification which is common to all the individual buttons of the button class, so that it is not necessarily requisite when the individual button output specification is directly referred to from, for example, the state shown in FIG. 33 on the basis of the following individual button MMBT.

First, the <button class id> is for uniquely identifying the button class and expressed by a character string or numeric value of a designation, symbol, number or internal data value, etc. Herein, it is displayed as, for example, "store" or "department". On the other hand, the <button information code> corresponds to the <button class id>, indicates the output characteristic, condition and type of multimedia information which is common to all the individual buttons of the button class and can arbitrarily be set depending on the application and needs. Further, the <individual button MMBT reference by every button group> corresponds to the <button class id> and specifies the storage location of the memory 3 where the individual button MMBT by every button group which defines by every button group the multimedia information output specification by every individual button of the button class is stored.

FIG. 36 illustrates an example of format of the <button information code> being a constituent element of each of the button class MMBT shown in FIG. 35 and the individual button MMBT by every button group shown in FIG. 37. Herein, the <button information code> consists of three elements, i.e., <type of button information>, <operation at button selection> and <display size>, and each specification thereof is expressed in one digit.

First, the <type of button information> is for expressing in one digit the type of multimedia information output at the top of operating button. For example, "0" means a character string, "1" means a graphic, "2" means a still picture, "3" means a moving picture, "4" means a voice and "5" means various combinations. On the other hand, the <operation at button selection> is for expressing in one digit the operation as a reaction correlated with the concerned button class or individual button at the time of button selection. The digits indicate the respective operations, for example, "0" means indicating only selected operation, "1" means initiation of voice output, "2" means initiation of moving picture and "3" means initiation of voice and moving picture outputs. Further, the <display size> is for expressing in one digit the size of multimedia information output made on the display unit 1. For example, "0" indicates outputting on the button top in the button size (original specified value), "1" indicates outputting in the size switched to that arbitrarily specified by the user and "2" indicates outputting in the size switched to the full screen size using the entire scope.

Although not provided in this example, the <button information code> may include other constituent elements such as length of output time, requirement for output repetition and its frequency. An arrangement is made so as to enable addition of these elements to the <button information code> according to necessity.

FIG. 37 shows the format of an individual button MMBT by every button group which corresponds to the <individual button MMBT reference by every button group> being a constituent element of the button class MMBT shown in FIG. 35, defines by every button group the multimedia information output specification by every individual button and is set and stored in the memory 3. The above individual button MMBT by every button group consists of three elements <individual button id>, <button information code> and <button information (contents) storage section> with respect to each individual button of button group, being consecutively arranged in a number as large as that of individual buttons of each button group and set in a number as large as that of button groups by every button class.

First, the <individual button id> is for uniquely identifying the individual button and expressed by a character string or numeric value of a designation, symbol, number or internal data value, etc. Herein, it is displayed as, for example, "store T1" or "store T2". On the other hand, the <button information code> corresponds to the <individual button id>, indicates the output characteristic, condition and type of multimedia information which is specific for the individual button and can arbitrarily be set depending on the application and needs. Further, the <button information (contents) storage section> corresponds to the <individual button id> and indicates the location of the multimedia information (contents) by every individual button stored in advance in the memory 3 by means of the area name on the memory 3, the file name on the disk or the like.

Referring to FIGS. 35 to 37; the formats for outputting multimedia information on the operating button have been described, whose application examples will be described below.

FIG. 38 shows the state of having the button class MMBT set and stored in the memory 3 on the basis of the operating buttons shown in FIG. 33. That is, the <button class id> is "store" on the basis of the button class "store" shown in FIG. 33(*a*). The <button information code> corresponding to the "store, is "000" in which the first "0"1 indicates "character string", the second "0" indicates "only selection" and the third "0" indicates "button top". The <individual button MMBT reference by every button group> is "tokyo.mbt". Further, the <button class id> is "department" on the basis of the button class "department" shown in FIG. 33(*b*). The <button information code> corresponding to the "department" is "200" in which the first "2" indicates "still picture" (for example, the facial photograph of department manager), the second "0" indicates "only selection" and the third "0" indicates "button top". The <individual button MMBT reference by every button group> is "sbumon.mbt". Still further, the <button class id> is "commodity" on the basis of the button class "commodity" shown in FIG. 33(*c*). The <button information code> corresponding to the "commodity" is "200" in which the first "2" indicates "still picture" (for example, the photograph of the commodity), the second "0" indicates "only selection" and the third "0" indicates "button top". The <individual button MMBT reference by every button group> is "dbunrui.mbt".

With respect to each button class, the thus set and stored button class MMBT identifies the output specification common to all the individual buttons of the button class.

Illustratively, what is shown in FIG. 33 is the state of having every <button information code> of the button class MMBT set at "000". In the above setting, the same state as shown in FIG. 33 is attained with respect to the button class "store". However, with respect to the button classes "department" and "commodity", a still picture is output at the button top. The output specification by every button group and by every individual button corresponding to each button class is identified by the individual button MMBT by every button group.

That is, FIG. 39 shows the state of having the individual button MMBT by every button group set and stored in the memory 3 on the basis of the operating buttons shown in FIG. 33. In FIG. 39(*a*), the <individual button id> is "store T1", "store T2" . . . on the basis of the button group "Tokyo" of the button class "store" shown in FIG. 33(*a*). The respective <button information codes> of "store T1" and "store T2" are both "200" in which the first "2" indicates "still picture" (for example, the photograph of the store), the second "0" indicates "only selection" and the third indicates "0" "button top". The respective <button information (contents) storage sections> are "shby.pht" and "ikbkr.pht".

When the <button class id> of the button class MMBT is "store", the <button information code> corresponding thereto is "000" as shown in FIG. 38. The first digit is "0", so that, initially, all the individual buttons are displayed by character strings. However, individual button "store T1" is selected with the use of the input unit 2, the <button information code> corresponding to "store T1" in the individual button MMBT by every button group "tokyo.mbt" corresponding thereto is "200" having "2" at its first digit, so that information "still picture" (for example, the photograph of "store T1") is read from "shby.pht" being <button information (contents) storage section> and replaces the character string displayed at the button top of individual button "store T1" by still picture output. When the "store T2" is selected as well, the above applies.

The above configuration enables switching the display of the individual button of the button class "store" from the initial character string shown in FIG. 33 to the multimedia information other than character string such as still picture corresponding to the selected individual button by selecting an individual button belonging to the above button class with the result that the user can conduct more facile individual button selection.

In FIG. 39(b), the <individual button id> is "foodstuff", "cosmetic" . . . on the basis of the button group "major department" of the button class "department" shown in FIG. 33(b). The respective <button information codes> of "foodstuff" and "cosmetic" are both "***" in which "*" indicates an omission showing the identicality with the value of the <button information code> corresponding to the "department" of the button class MMBT, i.e., "200". The <button information (contents) storage sections> corresponding to "foodstuff" and "cosmetic" are "fd.pht" and "csmtc.pht", respectively.

When the <button class id> of the button class MMBT is "department", the <button information code> corresponding thereto is "200" as shown in FIG. 38. The first digit is "2", so that information "still picture" (for example, the facial picture of respective department manager) is output on all the individual buttons. This is read from "fd.pht", "csmtc.pht", . . . as <button information (contents) storage sections> which correspond to "foodstuff", "cosmetic", . . . of "sbumon.mbt" being <individual button MMBT reference by every button group> of the concerned button class.

Even if individual button "foodstuff" is selected with the use of the input unit 2, the previously output still picture remains unchanged on the individual button "foodstuff" because the <button information code> of the corresponding individual button MMBT by every button group "sbumon.mbt" is an omission "***". When "cosmetic" is selected as well, the above applies. In the button class "department", still picture is output from the start on the top of individual button by the above common setting of button class in the button class MMBT, so that the user can conduct individual button selection while looking the still picture.

In FIG. 39(c), the <individual button id> is "commodity A", "commodity B", . . . on the basis of the button group "major classification" of the button class "commodity" shown in FIG. 33(c). The respective <button information codes> of "commodity A" and "commodity B" are both "321" in which the first "3" indicates "moving picture" (for example, the video image of each commodity), the second "2" indicates "initiation of moving picture output" and the third "1" indicates "arbitrary". The respective <button information (contents) storage sections> are "sf1.pht" and "sc2.pht".

When the <button class id> of the button class MMBT is "commodity", the <button information code> corresponding thereto is "200" as shown in FIG. 38. The first digit is "2", so that information "still picture" (for example, the photograph of each commodity) is output on all the individual buttons. This is read from "sf1.pht", "sc2.pht", . . . as <button information (contents) storage sections> within the commodity individual button MMBT by every button group "dbunrui.mbt" and output. When the individual button "commodity A" is selected with the use of the input unit 2, the <button information code> corresponding to "commodity A" in the corresponding individual button MMBT by every button group "dbunrui.mbt" is "321". The first digit thereof is "3", so that forefront frame information "moving picture" (for example, the video image of "commodity A") is read from "sf1.mvi" being <button information (contents) storage section> and subjected to switching output. Then, the second digit of the <button information code> is "2", the moving picture output is continued. The third digit is "1", so that the user can arbitrarily change the moving picture size. When the "commodity B" is selected as well, the above applies.

In the button class "commodity", the reason for the above first outputting by a still picture an individual button belonging to the button class "commodity" followed by switching to an output of moving picture with an arbitrary size upon selection of the individual button is that there are a wide variety of commodities so as to often render difficult the selection of commodity based on the understanding of meaning by the left part of the brain. That is, the display of individual button by every commodity with a still picture and an output of moving picture of arbitrary size switched therefrom enables the user to freely and naturally select any arbitrary commodity from a wide variety of commodities while looking the display.

The method of displaying operating buttons by switching to multimedia information output has been described. In this connection, as illustrated in its formats and application examples, two multimedia information button tables consisting of the button class MMBT and the individual button MMBT by every button group are set and stored in the memory 3 and updated according to necessity.

In the above examples, the display of operating buttons on the display unit 1 can be conducted by not only character strings but also various multimedia information outputs switched therefrom. Therefore, when the user instructs the computer 4 on processing to be executed, outputting multimedia information at the top of each individual button enables the user to make the most of his intuitive memory or recognition of the right part of his brain, so that button selecting manipulation can be performed more easily (freely and naturally).

When the multimedia information includes voice, it is naturally output by means of an audio output unit (not shown) built in the display (display unit) 1 or the computer 4.

Although in the above examples the display method is changed by every button class by providing the button class MMBT and the individual button MMBT by every button group, only individual buttons belonging to an arbitrary button class, for example, button class "commodity" can be output and displayed by multimedia information such as graphic. In this case, not only can each individual button belonging to the button class "commodity" be displayed from the outset by means of multimedia information output such as graphic on the basis of the button class MMBT but also it is feasible to initially effect the display by disposing a character string as shown in FIG. 33 and, when an individual button is selected, to switch the display of the selected individual button from a character string to multimedia information output such as graphic on the basis of the individual button MMBT.

FIGS. 40 to 42 illustrate an example in which arbitrary data values correlated with an arbitrary operating button are summed to thereby effect self diagnosis and in which the result is reflected on the operating button as diagnostic information and displayed, thereby enabling the user to conduct highly efficient button manipulation in accordance with the fundamental requirements.

Illustratively, the sales data by every individual button as shown in FIG. 40 are stored in the memory 3. The sales data consists of four columns, i.e., columns "individual button", "budget", "result" and "performance".

The column "individual button" includes individual buttons corresponding to those of FIG. 33(*a*) and (*b*). The "budget" and "result" indicate data value sums gained by summing, by every individual button, field 5 and field 6 data values, respectively, of the data shown in FIG. 2 (only data 1 to 3, 9, 10 and 12 to 16 whose field 1 data value is "Tokyo"). Further, the "performance" indicates a proportion (%) of a sum of data values "result" to that of data values "budget" obtained as a sales performance.

FIG. 40(*a*) corresponds shown in FIG. 33(*a*) and lists sales data "budget", "result" and "performance" obtained by setting four individual buttons of the button group "Tokyo" of the button class "store" and summing corresponding data values of the data shown in FIG. 2 by every individual button. FIG. 40(*b*) corresponds to FIG. 33(*b*) and lists sales data "budget", "result" and "performance" obtained by setting seven individual buttons of the button group "major department" of the button class "department" and summing corresponding data values of the data shown in FIG. 2 by every individual button in the same manner as above.

The summation of appropriate data values made by correlating data with operating buttons in advance as shown in FIG. 40 enables efficient self diagnosis of summed data values correlating with operating buttons on the basis of a below described data monitoring reference table.

Although the "budget" shown in FIG. 40 is obtained by summing data values of field 5 of the data shown in FIG. 2 by every individual button, creation of this data field "budget" may be saved, for example, by setting in advance a monthly budget (sales target), etc. by every individual button.

FIG. 41 illustrates an example of data monitoring reference table set and stored in the memory 3 which is so set as to be available commonly to both the button classes "store" and "department" of operating buttons shown in FIG. 33. It consists of "No.", "conditional expression" and "color of button (background color, same below)".

First, "No." is for partitioning conditional expressions and is expressed by a continued numeral. In this example, four partitioned conditional expressions are employed. However, only one conditional expression is satisfactory for deciding, for example, whether or not the sales target has been attained. Further, naturally, five or more partitioned conditional expressions may be employed. The "conditional expression" is used as a monitoring reference for self diagnosing the data value summed by every individual button. The "budget" vs. "result" magnitude relationships of the sales data shown in FIG. 40 are represented by four expressions different from each other. That is, in this example, four monitoring references (conditional expressions) are employed, and operating buttons matching the monitoring references are indicated by the respective display specifications different from each other. However, for deciding whether or not the sales target has been attained as mentioned above, it is satisfactory to provide one monitoring reference (conditional expression) and to indicate only operating buttons matching the monitoring reference with the use of another display specification. Finally, with respect to the "color of button", when the conditional expression is satisfied, namely, when the individual button matches the monitoring reference, the matching individual button is displayed in the color changed to the specified one. Although in this example the data monitoring reference table is set with the employment of the color of button as the object of change of display specification, this is not limiting and the display may be conducted in other specification such as a variety of dot formations. In this example, the color of the button is indicated by one alphabet.

The following will describe the "conditional expression" and "color of button" with respect to each "No." In this example, all the operating buttons are initially displayed in the color "W" (white).

The conditional expression" of "No. 1" indicates that the product of the "budget" of the sales data shown in FIG. 40 multiplied by 80% is greater than the "result", i.e., the "result" of the sales data is less than 80% of the "budget". The then "color of button" is "R", which indicates that the individual button satisfying the above condition has its color changed to "R" (red). The "conditional expression" and "color of button" of "No. 2" are the same as in "No. 1" above, except that it is indicated that, when the "result" of the sales data is less than 90% of the "budget", the individual button has its color changed to "Y" (yellow). The "conditional expression" of "No. 3" indicates that the product of the "budget" of the sales data shown in FIG. 40 multiplied by 110% is smaller than the "result", i.e., the "result" of the sales data exceeds 110% of the "budget". The then "color of button" is "G", which indicates that the individual button satisfying the above condition has its color changed to "G" (green). The "conditional expression" and "color of button" of "No. 4" are the same as in "No. 3" above, except that it is indicated that, when the "result" of the sales data exceeds 120% of the "budget", the individual button has its color changed to "B" (blue).

The data monitoring reference table shown in FIG. 41 is set and stored in the memory 3 and, at the display of the operating buttons on the display unit 1, self diagnosis of whether correlated sales data ("budget" and "result") by every individual button shown in FIG. 40, viz., the sum of data values by every individual button matches the monitoring reference, namely, satisfies the conditional expression of the data monitoring reference table is implemented in advance. The result of the diagnosis is reflected on the color of the individual button in effecting the display. This display will be described referring to FIG. 42.

FIG. 42 illustrates an example of individual button pattern in which the sum of data values ("budgt" and "result") by every individual button in each button class shown in FIG. 40 is self diagnosed on the basis of the data monitoring reference table shown in FIG. 41 and in which the diagnosis result is reflected on the color of the button in effecting the display.

That is, FIG. 42(*a*) corresponds to FIG. 33(*a*) and shows an example in which the self diagnosis information on the individual button of the button group "Tokyo" of the button class "store" is reflected on the color of the button in effecting the display to thereby enable explicitly recognizing in advance the level of difference between the "budget" and "result" of the sales data by every store corresponding to each individual button belonging to the button class "store" prior to the operating button selecting manipulation.

With respect to the individual button "store T3", as shown in FIG. 40(a), the performance is 88% and the sales data "result" is less than 90% of the "budget", thereby satisfying the No. 2 conditional expression of the data monitoring reference table shown in FIG. 41. Thus, the individual button is displayed in its color changed to "Y" (yellow). Further, with respect to the individual button "store T4", the performance is 115% and the sales data "result" exceeds 110% of the "budget", thereby satisfying the No. 3 conditional expression of the data monitoring reference table. Thus, the individual button is displayed in its color changed to "G" (green). The other individual buttons "store T1" and "store T2" do not satisfy any of the conditional expressions of the data monitoring reference table shown in FIG. 41, so that the buttons retain their initial color "W" (white).

FIG. 42(b) corresponds to FIG. 33(b) and shows an example in which the self diagnosis information on the individual button of the button group "major department" of the button class "department" is reflected on the color of the button in effecting the display to thereby enable explicitly recognizing in advance the level of difference between the "budget" and "result" of the sales data by every department corresponding to each individual button belonging to the button class "department" prior to the operating button selecting manipulation.

With respect to the individual button "dress", as shown in FIG. 40(b), the performance is 75% and the sales data "result" is less than 80% of the "budget", thereby satisfying the No. 1 conditional expression of the data monitoring reference table shown in FIG. 41. Thus, the individual button is displayed in its color changed to "R" (red). Further, with respect to the individual button "toy", likewise, the performance is 162% and the sales data "result" exceeds 120% of the "budget", thereby satisfying the No. 4 conditional expression of the data monitoring reference table. Thus, the individual button is displayed in its color changed to "B" (blue). The other individual buttons "foodstuff", "cosmetic", "men's suit", "household electric appliance", and "daily goods" retain their initial color "W" (white) as in the above instance.

Thus, the color of the individual button which has initially been "W" (white) reflects the situation of sales data by every store or department corresponding to the individual button and is changed in being displayed to "B" (blue) or "G" (green) when the situation is favorable (budget met) and to "R" (red) or "Y" (yellow) when the situation is unfavorable (budget not met) in accordance with the previously set monitoring reference, so that the user can recognize the situation of the sales as soon as looking the color of the displayed individual button.

As described above, the data values stored in the memory 3 are summed by every individual button and self diagnosed with the use of the conditional expression correlated with the individual button on the basis of the data monitoring reference table, and the individual button matching the monitoring reference, viz., the individual button satisfying the correlated conditional expression is displayed on the display unit 1 in the specification changed from those of other individual buttons on the basis of the diagnosis result, so that the user can explicitly recognize the above diagnosis result prior to the operating button selecting manipulation with the result that the button manipulation with improved efficiency is realized.

Although in the above example the data monitoring reference table has been set corresponding to both of the two button classes "store" and "department", it is feasible to set a data monitoring reference table varied according to button class or to set a data monitoring reference table corresponding to only one of the button classes, with only the operating buttons belonging to the one button class brought under correlation with the data monitoring reference table. Further, the data monitoring reference table can naturally be set corresponding to each button group or individual button and the setting thereof can be made in a number as large as desired.

In the claims:

1. A method of generating operating buttons for computer processing, which comprises:

providing a plurality of data stored in memory, each of the plurality of data composed of a plurality of fields, each of the plurality of fields containing data values;

setting in a parallel arrangement a plurality of button classes, each button class corresponding to a field of the plurality of data;

setting button groups and individual buttons for each of the button classes, each button group grouping the data values contained in the field corresponding to said each button class, each individual button corresponding to one of the data values, and displaying on a display unit operating buttons composed of a combination of the button classes, the button groups and the individual buttons, wherein:

said operating buttons are arranged in parallel lines;

the number of parallel lines of operating buttons correspond to the number of button classes;

when there is no correlation between at least two of the button classes, setting the button groups and the individual buttons for each of the button classes includes setting each button group according to its button class; and when there is correlation between at least two of the button classes, setting the button groups and the individual buttons for each of the button classes includes forming a hierarchical correlation between the at least two button classes, whereby the selection of a button in one of the at least two button classes selects in another of the at least two button classes as a function of the hierarchical correlation therebetween one of an individual button and a button group.

2. The method as claimed in claim 1, wherein:

each field is one of a character field and a numeric field on the basis of the data values contained therein;

the character fields are automatically identified as categorical fields; and the button classes corresponding to the character fields are automatically set.

3. The method as claimed in claim 2, wherein:

each individual button is set on the basis of the data value corresponding thereto; and the data values contained in each of the fields corresponding to the button classes displayed in the parallel arrangement are automatically set as designations of the individual buttons.

4. The method as claimed in claim 3, further comprising:

displaying the individual buttons of a button class other than the button class to which an individual button selected with the use of an input unit belongs, wherein:

the displayed individual buttons of the button class correlate with the data values within a field of the data;

data corresponding to the data values in the field of data corresponding to the selected individual buttons are retrieved; and the individual buttons of other button classes corresponding to other fields of the retrieved data and the data values thereof are retrieved and displayed.

5. The method as claimed in claim 4, wherein:

hierarchization is conducted among the plurality of button classes displayed in parallel; and individual buttons of the other button class are extracted according to the hierarchical sequence and displayed.

6. The method as claimed in claim 1, wherein:

a new individual button is included in one of the button classes;

the new individual button summarizes a selection of a plurality of individual buttons out of the individual buttons belonging to one of the button classes; and selecting the new individual button causes the state of selection of the individual buttons summarized by the new individual button to be automatically emulated.

7. The method as claimed in claim 1, wherein:

a plurality of individual buttons of the individual buttons belonging to a common button class are summarized into a new individual button on the basis of at least one of (i) the frequency of individual button selection conducted with the use of an input unit; (ii) the data values corresponding to the individual buttons; and (iii) user selection; and the individual buttons summarized by the new individual button are omitted from the display.

8. The method as claimed in claim 1, further comprising:

selecting an individual button from each button class displayed on the display unit;

forming a button selection pattern corresponding to the selected individual buttons;

storing the button selection pattern in a link table in the memory;

identifying appropriate data on the basis of the button selection patterns in the link table and the position of display of one of a plurality of individual buttons selected by means of an input unit among the individual buttons of each of the button classes displayed on the display unit; and fetching the appropriate data stored in the memory.

9. The method as claimed in claim 1, further comprising:

storing in a button manipulation history table set in the memory an operation history of a series of states of previously conducted individual button selection occurring in at least two button classes; and in response to selecting an individual button of at least one button class, an individual button of another button class is displayed in its previously selected state on the basis of the operation history stored in the button manipulation history table and the state of selection of the selected individual button.

10. The method as claimed in claim 1, wherein:

a displayed sequence of individual buttons belonging to each of the plurality of button classes displayed in parallel is varied on the basis of at least one of:
the frequency of individual button selections conducted with the use of an input unit;
data values corresponding to the individual buttons; and
user selection.

11. The method as claimed in claim 1, wherein:

displayed sizes of individual buttons belonging to each of the plurality of button classes displayed in parallel are varied on the basis of one of (i) the frequency of individual button selections conducted with the use of an input unit, and (ii) data values corresponding to the individual buttons.

12. The method as claimed in claim 1, wherein at least one of displayed position and displayed size of individual buttons in different button classes is varied on the basis of one of (i) the cumulative frequency of all individual button selections within each button class, and (ii) user selection.

13. The method as claimed in claim 1, wherein:

multimedia information corresponding to individual buttons belonging to at least one button class is stored in a memory;

the individual buttons are correlated with the multimedia information corresponding thereto by an individual button multimedia information button table by button groups set in the memory;

display specifications regarding the type of multimedia information at display on the individual buttons and the action at button selection are defined in the individual button multimedia information button table by button groups; and when the individual buttons are at least one of (i) displayed on the display unit, and (ii) selected with the use of an input unit, the multimedia information corresponding to the selected individual buttons is displayed on the top of the individual buttons in accordance with the defined display specifications.

14. The method as claimed in claim 13, wherein:

a button class multimedia information button table is set in the memory; and a common specification regarding multimedia information of the individual buttons is defined in the button class multimedia information button table for every button class.

15. The method as claimed in claim 1, wherein:

values of numeric fields of data are stored in the memory;

each stored numeric field value is summarized by an individual button belonging to a button class;

the summarized numeric field values are self-diagnosed by means of a data monitoring reference table including a conditional expression providing a monitoring reference; and on the display unit, a display specification of at least one of the individual buttons is changed from that of the other individual buttons as a function of the summarized numeric field value for the at least one of the individual buttons satisfying the conditional expression.

16. The method as claimed in claim 1, wherein:

a value of at least one numeric field of data stored in the memory is summarized by an individual button belonging to a button class;

the summarized numeric field value is self-diagnosed by means of a data monitoring reference table including a conditional expression providing a monitoring reference; and on the display unit, a display specification of the individual button is changed from that of other individual buttons displayed on the display unit as a function of the summarized numeric field value of the individual button satisfying the conditional expression.

* * * * *

UNITED STATES PATENT AND TRADEMARK OFFICE
CERTIFICATE OF CORRECTION

PATENT NO. : 5,821,926
DATED : October 13, 1998
INVENTOR(S) : Hidehiro Arita

It is certified that error appears in the above-identified patent and that said Letters Patent is hereby corrected as shown below:

Column 11 Lines 33-34 "button classes 1, 2, 3 and 4" should read --button classes 1, 2, 3 and 4-- (delete bold).

Column 11 Line 36 "button classes 1 to 4" should read --button classes 1 to 4-- (delete bold).

Column 11 Line 41 "button class 1" should read --button class 1-- (delete bold).

Column 11 Line 42 "button class 2" should read --button class 2-- (delete bold).

Column 11 Line 43 "button class 3" should read --button class 3-- (delete bold).

Column 11 Line 45 "button class 4" should read --button class 4-- (delete bold).

Column 11 Line 65 "button class 1 and button class 3" should read --button class 1 and button class 3-- (delete bold).

Column 12 Line 12 "button class 1" should read --button class 1-- (delete bold).

Column 12 Line 15 "button class 3" should read --button class 3-- (delete bold).

Column 12 Line 16 after "feasible" delete period --.--.

Column 12 Line 35 "button class 1" should read --button class 1-- (delete bold).

UNITED STATES PATENT AND TRADEMARK OFFICE
CERTIFICATE OF CORRECTION

PATENT NO. : 5,821,926
DATED : October 13, 1998
INVENTOR(S) : Hidehiro Arita

It is certified that error appears in the above-identified patent and that said Letters Patent is hereby corrected as shown below:

Column 12 Line 36 "button class 3" should read --button class 3-- (delete bold).

Column 12 Line 39 "button class 3" should read --button class 3-- (delete bold).

Column 12 Line 40 "button group 1-1" should read --button group 1-1-- (delete bold).

Column 12 Line 44 "button class 3" should read --button class 3-- (delete bold).

Column 12 Line 47 "button group 1-2" should read --button group 1-2-- (delete bold).

Column 12 Line 50 "button class 3" should read --button class 3-- (delete bold).

Column 12 Line 51 "button class 1" should read --button class 1-- (delete bold).

Column 12 Line 54 "button class 1" should read --button class 1-- (delete bold).

Column 12 Line 55 "button group 3-1" should read --button group 3-1-- (delete bold).

Column 12 Line 59 "button class 1" should read --button class 1-- (delete bold).

Column 12 Line 60 "button group 3-2" should read --button group 3-2-- (delete bold).

UNITED STATES PATENT AND TRADEMARK OFFICE
CERTIFICATE OF CORRECTION

PATENT NO. : 5,821,926
DATED : October 13, 1998
INVENTOR(S) : Hidehiro Arita

It is certified that error appears in the above-identified patent and that said Letters Patent is hereby corrected as shown below:

Column 13 Line 14 "button class 1" should read --button class 1-- (delete bold).

Column 13 Line 15 "button class 3" should read --button class 3-- (delete bold).

Column 13 Line 19 "button class 1" should read --button class 1-- (delete bold).

Column 13 Line 20 "button class 3" should read --button class 3-- (delete bold).

Column 13 Line 21 "button code '11'" should read --button code "11"-- (delete bold).

Column 13 Line 23 "button class 1" should read --button class 1-- (delete bold).

Column 13 Line 24 "button class 3" should read --button class 3-- (delete bold).

Column 13 Line 25 "12" should read --21--.

Column 13 Line 25 "button codes 11 and 12" should read --button codes 11 and 21--.

Column 13 Line 26 "'11'" should read --"11"-- (delete bold).

Column 13 Line 27 "'21'" should read --"21"-- (delete bold).

Column 13 Line 42 "button class 1" should read --button class 1-- (delete bold).

UNITED STATES PATENT AND TRADEMARK OFFICE
CERTIFICATE OF CORRECTION

PATENT NO. : 5,821,926
DATED : October 13, 1998
INVENTOR(S) : Hidehiro Arita

It is certified that error appears in the above-identified patent and that said Letters Patent is hereby corrected as shown below:

Column 13 Line 43 "button class 3" should read --button class 3-- (delete bold).

Column 13 Line 50 "button class 1" should read --button class 1-- (delete bold).

Column 13 Line 51 "button class 3" should read --button class 3-- (delete bold).

Column 16 Line 50 between "individual" and "buttons" delete hyphen --,--.

Column 18 Line 7 "1010102" should read --010102--.

Column 20 Line 15 "2" should read --2-- (delete bold).

Column 21 Line 15 "sequence 3" should read --sequence 3-- (delete bold).

Column 21 Line 20 "sequence 3" should read --sequence 3-- (delete bold).

Column 21 Line 26 "sequence 2" should read --sequence 2-- (delete bold).

Column 21 Line 27 "sequence 3" should read --sequence 3-- (delete bold).

Column 21 Line 66 after "the" delete period --.--.

Column 23 Line 11 after "selecting" delete period --.--.

Column 25 Line 35 "tablet" should read --table--.

UNITED STATES PATENT AND TRADEMARK OFFICE
CERTIFICATE OF CORRECTION

PATENT NO. : 5,821,926
DATED : October 13, 1998
INVENTOR(S) : Hidehiro Arita

It is certified that error appears in the above-identified patent and that said Letters Patent is hereby corrected as shown below:

Column 28 Line 46 "Kanagawall" should read --Kanagawa--.

Column 32 Line 12 after "37" delete ";" and insert -,--.

Column 32 Line 20 "'0'1" should read --"0"--.

Column 33 Line 64 "sf1.pht" should read --sf1.pht-- (delete bold).

Column 33 Line 65 "sc2.pht" should read --sc2.pht-- (delete bold).

Column 34 Line 1 "'2'" should read --"2"-- (delete bold).

Column 34 Line 4 "sf1.pht" should read --sf1.pht-- (delete bold).

Column 34 Line 4 "sc2.pht" should read --sc2.pht-- (delete bold).

Column 34 Line 14 "sf1.mvi" should read --sf1.mvi-- (delete bold).

Column 37 Line 11 "store T4" should read --store T4-- (delete bold).

Signed and Sealed this

Fourth Day of May, 1999

Attest:

*Attesting Officer*

Q. TODD DICKINSON

*Acting Commissioner of Patents and Trademarks*